US012260663B2

(12) United States Patent
Liberty et al.

(10) Patent No.: US 12,260,663 B2
(45) Date of Patent: Mar. 25, 2025

(54) PATENT MATCHING ANALYSIS SYSTEM

(71) Applicant: HUMMINGBIRD IP, LLC, Orlando, FL (US)

(72) Inventors: Michael A. Liberty, Orlando, FL (US); Ricardo O. Giovannone, Albiate (IT); Giovanni A. Dalmaso, Houston, TX (US)

(73) Assignee: HUMMINGBIRD IP, LLC, Orlando, FL (US)

( * ) Notice: Subject to any disclaimer, the term of this patent is extended or adjusted under 35 U.S.C. 154(b) by 432 days.

(21) Appl. No.: 17/539,992

(22) Filed: Dec. 1, 2021

(65) Prior Publication Data

US 2022/0172502 A1    Jun. 2, 2022

Related U.S. Application Data

(60) Provisional application No. 63/120,626, filed on Dec. 2, 2020.

(51) Int. Cl.
*G06F 16/00* (2019.01)
*G06F 16/23* (2019.01)
(Continued)

(52) U.S. Cl.
CPC ........ *G06V 30/416* (2022.01); *G06F 16/2379* (2019.01); *G06F 16/3344* (2019.01);
(Continued)

(58) Field of Classification Search
CPC .. G06V 30/416; G06V 30/413; G06V 30/412; G06F 40/205; G06F 40/169;
(Continued)

(56) References Cited

U.S. PATENT DOCUMENTS 6,446,061 B1    9/2002    Doerre
7,296,015 B2    11/2007    Poltorak
(Continued)

FOREIGN PATENT DOCUMENTS

| WO | WO2000060495 A2 | * | 10/2000 |
| WO | WO 03079231 A1 | * | 9/2003 |
| WO | WO 2009075554 A2 | * | 6/2009 |

OTHER PUBLICATIONS

Lea Helmers et al., "Automating the search for a patent's prior art with a full text similarity search", PloS one. 2019;14(3):e0212103.*

(Continued)

*Primary Examiner* — Srirama Channavajjala
(74) *Attorney, Agent, or Firm* — Workman Nydegger

(57) ABSTRACT

A patent matching analysis system receives an input indicating a source patent or a court case. When the input indicates a court case, the system identifies a patent associated with the court case, which is deemed as a source patent. For each source patent, the system retrieves a source patent document, parses textual information of the source patent document using an NLP engine, extracts a first set of features, and generates a first feature vector. The system then identifies multiple candidate patents. For each of the candidate patents, the system retrieves a candidate patent document, parses the textual information, extracts a second set of features, and generates a second feature vector. The system then determines a similarity between the first and second feature vectors. Based on the determined similarities, the system identifies one or more target patents, and visualizes the source patent and the determined target patents.

13 Claims, 17 Drawing Sheets

(51) Int. Cl.
  *G06F 16/334* (2025.01)
  *G06F 16/34* (2019.01)
  *G06F 16/38* (2019.01)
  *G06F 16/901* (2019.01)
  *G06F 16/93* (2019.01)
  *G06F 16/955* (2019.01)
  *G06F 40/205* (2020.01)
  *G06V 30/412* (2022.01)
  *G06V 30/413* (2022.01)
  *G06V 30/416* (2022.01)

(52) U.S. Cl.
  CPC ............ *G06F 16/34* (2019.01); *G06F 16/382* (2019.01); *G06F 16/901* (2019.01); *G06F 16/9024* (2019.01); *G06F 16/93* (2019.01); *G06F 16/9558* (2019.01); *G06F 40/205* (2020.01); *G06V 30/412* (2022.01); *G06V 30/413* (2022.01)

(58) Field of Classification Search
  CPC .... G06F 16/9024; G06F 16/34; G06F 16/382; G06F 16/93; G06F 16/2379; G06F 16/901; G06F 16/9558; G06F 16/972; G06F 16/3344; G06F 16/332; G06Q 50/184; G06Q 50/18
  See application file for complete search history.

(56) References Cited

U.S. PATENT DOCUMENTS

| | | |
|---|---|---|
| 7,606,757 B1 | 10/2009 | Poltorak |
| 7,792,728 B2 | 9/2010 | Poltorak |
| 7,792,832 B2 | 9/2010 | Poltorak |
| 7,801,909 B2 | 9/2010 | Poltorak |
| 7,904,453 B2 | 3/2011 | Poltorak |
| 10,719,666 B1 * | 7/2020 | Walters ............... G06N 3/08 |
| 2002/0022974 A1 * | 2/2002 | Lindh ............... G06F 16/34 707/E17.093 |
| 2013/0262968 A1 * | 10/2013 | Gartman ............... G06F 40/205 715/202 |
| 2014/0180934 A1 * | 6/2014 | Surdeanu ............ G06F 16/3344 705/310 |
| 2016/0253679 A1 | 9/2016 | Venkatraman et al. |
| 2016/0350294 A1 * | 12/2016 | Nefedov ............... G06F 16/367 |
| 2017/0262412 A1 * | 9/2017 | Liang ............... G06F 40/10 |
| 2019/0073730 A1 | 3/2019 | Perkowski et al. |
| 2020/0193153 A1 * | 6/2020 | Lee ............... G06F 40/226 |

OTHER PUBLICATIONS

Vishal Gaur, Information Extraction From Patent Office Actions Using NLPtechniques, Master of Science Thesis, Tampere University, Oct. 2020.*
Stanford resources: The Stanford Non-Practicing Entity (NPE) Litigation Database https://law.stanford.edu/projects/stanford-npe-litigation-database/#slsnav-brief-dataset-methodology.
https://www.if4it.com/taxonomy.html.
https://www.nasa.gov/offices/oct/taxonomy/index.html.
https://www.wandinc.com/wand-taxonomy-catalog.
http://eil.stanford.edu/publications/sid/icegov_2012.pdf.
https://data.epo.org/linked-data/documentation/patent-ontology-reference.html.
https://en.wikipedia.org/wiki/Ontology_(information_science).
https://www.ifm.eng.cam.ac.uk/research/ctm/ctmpublications/ctmworkingpapers/exploring-the-future-of-patent-analytics.
https://opennlp.apache.org/.
https://gate.ac.uk/?utm_source=PredictiveAnalyticsToday&utm_medium=Review&utm_campaign=PAT.
Wang, et al., "Towards enhancing centroid classifier for text classification—A border-instance approach", https://www.sciencedirect.com/science/article/pii/S0925231212006595.

* cited by examiner

300A

| 0 | 1 | 2 | 3 | 4 | 5 | 6 |
|---|---|---|---|---|---|---|
| Compute | Processor | classify | natural | language | machine | learning |

A computing system comprising: one or more processors; and one or more computer readable media having stored thereon computer executable instructions that are structured such that, when executed by the one or more processors. . . .

| 0 | 1 | 2 | 3 | 4 | 5 | 6 |
|---|---|---|---|---|---|---|
| Compute | Processor | classify | natural | language | machine | Learning |
| 3 | 2 | 0 | 0 | 0 | 0 | 0 |

*FIG. 3C*

PATENT MATCHING ANALYSIS SYSTEM

CROSS-REFERENCE TO RELATED APPLICATION

This application claims the benefit of U.S. Provisional Application No. 63/120,626, filed Dec. 2, 2020, the entire contents of which are herein incorporated by reference.

BACKGROUND

Around the world, there are many patent offices that store and publish their patent applications and issue patents online through their respective data systems. A user can perform searches based on the patents' identifiers (e.g., application numbers, patent numbers), titles, applicant names, and/or keywords contained in the specification to find a particular patent or a set of patents. However, since it is difficult to select proper keywords and identify proper search strategies in patent searches, many patent owners or applicants would hire specialized patent research firms to perform important patent searches.

Similarly, many different courts also store and publish court documents through their respective data systems. Some court cases (e.g., patent infringement cases) would refer to patents involved in the cases. Parties involved in the litigations may also want to perform patent searches to identify similar patents for various purposes. For example, an alleged infringer may want to find related patents to invalidate the patent that is potentially being infringed.

Additionally, a user may want to obtain certain information associated with the ontology of a patent, including pieces of data contained in the prosecution history. In such a case, the user must glance through the file wrapper of the prosecution history, and take notes of the pieces of data. In some other cases, the sought-for information may be embedded in one of the documents in the file wrapper, and the user needs to identify a particular document that may contain the sought-for information, and download and review the downloaded document to determine whether the document indeed contains the sought-for information. If the document does not contain the information that the user needs, the user has to go back to the file wrapper and try to identify the next document that may contain the information. This process may need to be repeated a few times until the user finally finds the proper document that contains the sought-for information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Some of the embodiments described herein are related to a patent matching analysis system implemented at a computing system and/or a method for analyzing patents and/or court documents and identifying matching and/or related patents. The computing system receives an input indicating a source patent or a court case. The source patent is a patent application or an issued patent published by one of one or more data systems that publish patent documents (e.g., different countries' patent offices). The court case is a dispute between parties that is decided or to be decided by one of a plurality of courts (e.g., different state courts, federal courts, other countries courts). The court that decides the court case often has a data system that publishes court documents associated with the court case.

The data systems that publish the patent document are also referred to as one or more first data systems, and the data systems that publish the court documents are also referred to as one or more second data systems. In some cases, when the computing system receives an input indicating a court case, the computing system may first determine which one of the one or more second data systems contains court documents that are associated with the court case. The computing system then retrieves a court document associated with the court case from the determined second data system. The textual information of the court document may then be parsed using a natural language processing (NLP) engine. Based on the parsed textual information of the court document, the computing system then determines that the court document is associated with a patent. Once the patent is identified, the computing system may treat the patent as a source patent.

For the source patent (which may be input by a user or extracted from a court document), the computing system first determines which one of the one or more first data systems contains the source patent, which may be based on a patent number received from a user input or identified by the court document. The computing system then retrieves source patent document(s) associated with the source patent from the determined first data system and parses textual information of the source patent using the NLP engine. Based upon the parsed textual information, the computing system extracts a set of features that represents the parsed textual information of the patent document (hereinafter, also referred to as a first set of features). The set of features are then transformed into a feature vector (hereinafter, also referred to as a first feature vector). The first feature vector is a vector that has a plurality of dimensions, each of which corresponds to a value of a feature contained in the first set of features.

The computing system then determines a similarity (e.g., generates a similarity score) between the first feature vector (representing the source patent) and the second feature vector (representing a candidate patent). Based on the similarity between the first feature vector and each second feature vector, the computing system identifies one or more target patents. For example, in some embodiments, when a similarity between the first feature vector and a second feature vector is greater than a predetermined threshold, the computing system determines that the candidate patent is a target patent. As another example, in some embodiments, the computing system identifies a predetermined number of candidate patents that are the most similar to the source patent (i.e., have the highest similarity score(s)) as target patents.

Additional principles described herein are related to identifying and visualizing ontology of related court cases and patent cases, which can be implemented at the computing system that performs patent matching and/or builds the taxonomy system, or independently at a separate computing system. In embodiments, the computing system or a separate computing system (hereinafter also referred to as an ontology generator) receives an input indicating a court case and retrieves a court document associated with the court case from one of one or more data systems that publish court documents. The ontology generator parses textual information of the court document using an NLP engine. Based on the parsed textual information of the court document, the ontology generator identifies information associated with ontology of the court document, including (but not limited to) title, date, defendant, plaintiff, court, judge, one or more other court cases associated with the court case, and/or one or more patents associated with the court case.

For each of the identified one or more patents, the ontology generator further retrieves a patent document from one of one or more data systems that publish patent documents. The ontology generator parses textual information of the patent document using the NLP engine and identifies information associated with ontology of the patent document, including (but not limited to) title, inventor, date, examiner, U.S. Class, International Patent Class, field of search, claims, abstract, cross references, or cited references.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 3A illustrates an example dictionary including a plurality of words;

FIG. 3B illustrates an example text document;

FIG. 3C illustrates an example matrix generated based on the dictionary of FIG. 3A and the text document of FIG. 3B;

DETAILED DESCRIPTION

Figure 1:
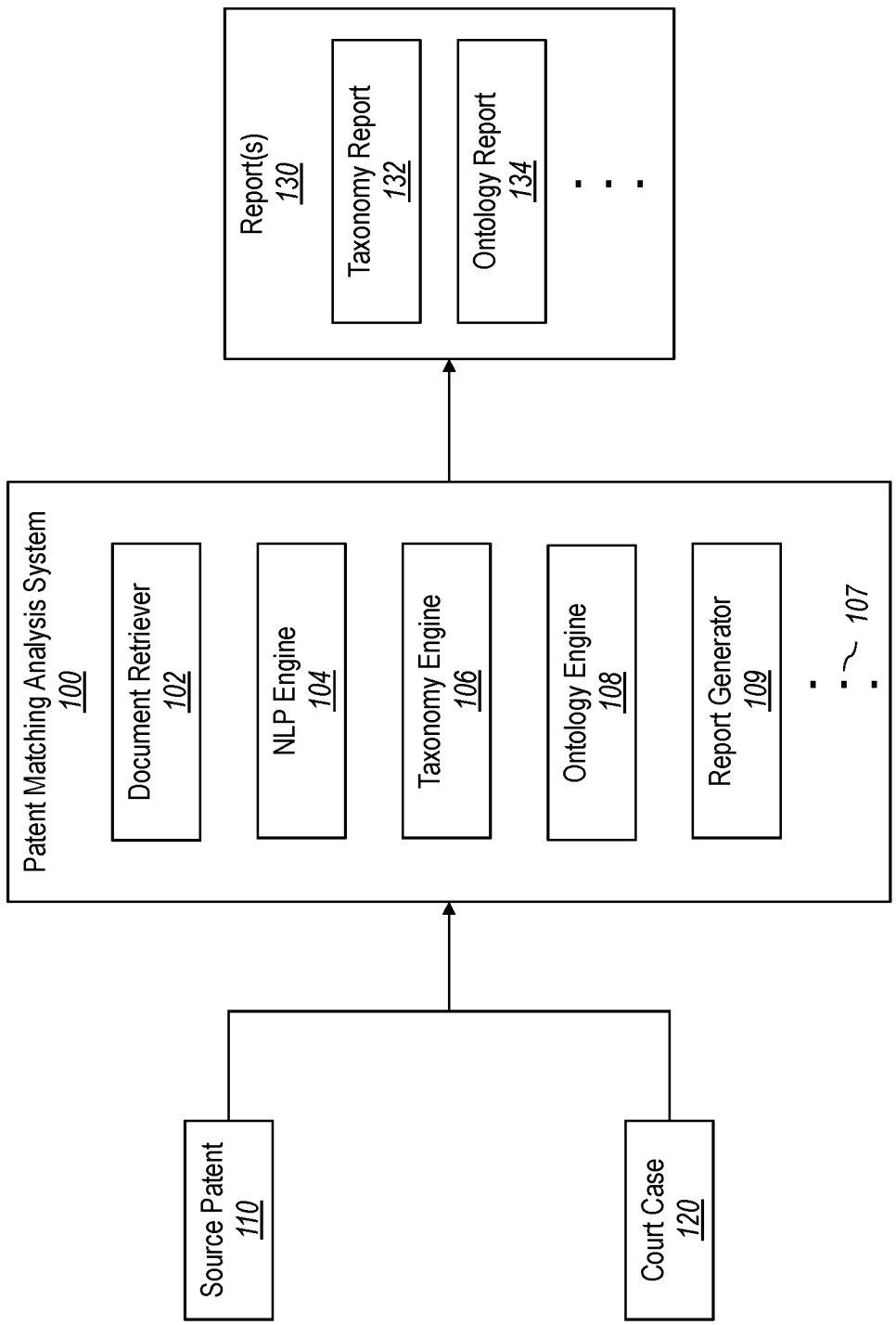
FIG. 1 illustrates an example architecture of a patent matching analysis system.

The embodiments described herein are related to a patent matching analysis system implemented at a computing system and/or a method for analyzing patents and/or court documents and identifying matching and/or related patents and generating ontology of related court cases and patent cases.

Some of the embodiments described herein are related to a patent matching analysis system implemented at a computing system and/or a method for analyzing patents and/or court documents and identifying matching and/or related patents. The computing system receives an input indicating a source patent or a court case. The source patent is a patent application or an issued patent published by one of one or more data systems that publish patent documents (e.g., different countries' patent offices). The court case is a dispute between parties that is decided or to be decided by one of a plurality of courts (e.g., different state courts, federal courts, other countries courts). The court that decides the court case often has a data system that publishes court documents associated with the court case.

The data systems that publish the patent document are also referred to as one or more first data systems, and the data systems that publish the court documents are also referred to as one or more second data systems. In some cases, when the computing system receives an input indicating a court case, the computing system may first determine which one of the one or more second data systems contains court documents that are associated with the court case. The computing system then retrieves a court document associated with the court case from the determined second data system. The textual information of the court document may then be parsed using a natural language processing (NLP) engine. Based on the parsed textual information of the court document, the computing system then determines that the court document is associated with a patent. Once the patent is identified, the computing system may treat the patent as a source patent.

For the source patent (which may be input by a user or extracted from a court document), the computing system first determines which one of the one or more first data systems contains the source patent, which may be based on a patent number received from a user input or identified by the court document. The computing system then retrieves source patent document(s) associated with the source patent from the determined first data system and parses textual information of the source patent using the NLP engine. Based upon the parsed textual information, the computing system extracts a set of features that represents the parsed textual information of the patent document (hereinafter, also referred to as a first set of features). The set of features are then transformed into a feature vector (hereinafter, also referred to as a first feature vector). The first feature vector is a vector that has a plurality of dimensions, each of which corresponds to a value of a feature contained in the first set of features.

In some embodiments, parsing textual information of the source patent document further includes identifying at least one of the following: (1) textual information of a title of the patent, (2) textual information of an abstract section of the patent, and/or (3) textual information of a claim section of the patent. In some embodiments, the first set of features is generated based on the identified textual information of the title, the abstract section, and/or the claim section.

In some embodiments, parsing textual information of the source patent document also includes identifying textual information of a cross-reference section of the source patent. Based on the textual information of the cross-reference section of the source patent, the computing system identifies a patent that is contained in the cross-references section of the source patent. This identified patent in the cross references section may also be treated as a source patent (hereinafter also referred to as a second source patent).

For each source patent, the computing system identifies a plurality of candidate patents, each of which is a patent application or an issued patent published by one of the one or more first data systems. For each of the plurality of candidate patents, the computing system (1) retrieves the candidate patent from one of the one or more first data systems, (2) parses textual information of the candidate patent using the NLP engine, (3) extracts a set of features representing the parsed textual information of the candidate patent (hereinafter, also referred to as a second set of features), and (4) transforms the set of features into a feature vector (herein, also referred to as a second feature vector). Similar to the first feature vector, the second feature vector is a vector that has a plurality of dimensions, each of which corresponds to a value of a feature contained in the second set of features.

The computing system then determines a similarity (e.g., generates a similarity score) between the first feature vector (representing the source patent) and the second feature vector (representing a candidate patent). Based on the similarity between the first feature vector and each second feature vector, the computing system identifies one or more target patents. For example, in some embodiments, when a similarity between the first feature vector and a second feature vector is greater than a predetermined threshold, the computing system determines that the candidate patent is a target patent. As another example, in some embodiments, the computing system identifies a predetermined number of candidate patents that are the most similar to the source patent (i.e., have the highest similarity score(s)) as target patents.

In some embodiments, the computing system treats each patent in each of the one or more first data systems as a candidate patent. In such a case, the computing system traverses each patent in the one or more first data systems to determine a similarity between the source patent and the corresponding patent.

Alternatively, the computing system may limit the candidate patents to a subset of the patents. In some embodiments, the computing system may limit the candidate patents to those that have application dates between a predetermined period. Alternatively, or in addition, the computing system may limit the candidate patents to those that have an assignee that is on a predetermined list of entities. Alternatively, or in addition, parsing textual information of the source patent document further includes identifying a list of keywords associated with the source patent, and the computing system limits the candidate patents to be those that contain the list of keywords. Alternatively, or in addition, parsing textual information of the source patent document includes identifying at least one of (1) an international class, (2) a U.S. class, or (3) a field of search of the source patent, and the computing system limits the candidate patents to be those that share at least one of (1) the international class, (2) the U.S. class, and/or (3) the field of search of the source patent as the plurality of candidate patents.

In yet some embodiments, the computing system uses a machine learning generated taxonomy system to identify the plurality of candidate patents. The taxonomy system has categorized the patents in the one or more first data systems into a plurality of categories. The computing system first determines that the source patent belongs to one of the plurality of categories in the taxonomy system. Based on the identified category, the computing system then identifies patents that belong to the identified category as candidate patents.

The taxonomy system may be built by the computing system that performs patent matching or by a separate computing system that only performs machine learning classification. To build the taxonomy system, the computing system or a separate computing system (hereinafter, also referred to as a taxonomy builder) retrieves and analyzes all the patent documents or a portion of patent documents in the one or more first data systems. Various machine learning classification technologies may be implemented to generate the taxonomy system.

In some embodiments, hierarchical classification is used to classify a plurality of patent documents. In embodiments, for each of the plurality of patent documents, the taxonomy builder (1) parses textual information of the patent document using an NLP engine, (2) generates a set of features (hereinafter also referred to as a third set of features) representing the parsed textual information of the patent, and (3) transforms the set of features to a feature vector (hereinafter also referred to as a third feature vector). Similar to the first feature vector and the second feature vector, the third feature vector is a vector having a plurality of dimensions, each of which corresponds to a value of a feature contained in the third set of features.

The taxonomy builder can then use hierarchical classification machine learning technologies to classify the plurality of third feature vectors into the plurality of categories. Each category can also be represented by a category vector. Various embodiments may be implemented to determine a category vector. In some embodiments, a centroid of all the third feature vectors within a category is determined as a category vector representing the corresponding category.

The taxonomy builder is also capable of assigning or classifying an uncategorized patent document to one of the categories in an existing taxonomy system. For example, when the taxonomy system is built by a portion of patent documents in the one or more data systems, the rest of the patent documents that are not used to build the taxonomy system would not be classified to a category of the taxonomy system in the building process. Also, when a new patent document is published, the new patent document is also not classified to a category of the taxonomy system. It is advantageous to assign these uncategorized patent documents to one of the categories in the existing taxonomy system.

In some embodiments, the taxonomy builder is configured to identify a patent document in one of the one or more data systems that is not categorized in the taxonomy system. The identified patent document is then retrieved from the one or more data systems. Textual information of the retrieved patent document is then parsed by the NLP engine. A set of features (hereinafter also referred to as a fourth set of features) of the patent document is also extracted from the textual information of the patent document and transformed into a feature vector (hereinafter also referred to as a fourth feature vector). The fourth feature vector is then compared with each category vector to determine a similarity. The taxonomy builder then assigns the patent document to a category corresponding to a category vector that has a highest similarity to the fourth feature vector corresponding to the patent document.

Additional principles described herein are related to identifying and visualizing ontology of related court cases and patent cases, which can be implemented at the computing system that performs patent matching and/or builds the taxonomy system, or independently at a separate computing system. In embodiments, the computing system or a separate computing system (hereinafter also referred to as an ontology generator) receives an input indicating a court case and retrieves a court document associated with the court case from one of one or more data systems that publish court documents. The ontology generator parses textual information of the court document using an NLP engine. Based on the parsed textual information of the court document, the ontology generator identifies information associated with ontology of the court document, including (but not limited to) title, date, defendant, plaintiff, court, judge, one or more other court cases associated with the court case, and/or one or more patents associated with the court case.

For each of the identified one or more patents, the ontology generator further retrieves a patent document from one of one or more data systems that publish patent documents. The ontology generator parses textual information of the patent document using the NLP engine and identifies information associated with ontology of the patent document, including (but not limited to) title, inventor, date, examiner, U.S. Class, International Patent Class, field of search, claims, abstract, cross references, or cited references.

In some embodiments, for at least one of the one or more identified patents, the ontology generator further retrieves prosecution history of the patent and parses textual information of the prosecution history of the patent using the NLP engine. The ontology generator further identifies information associated with ontology of the prosecution history, including (but not limited to) (1) Office event(s), (2) Applicant event(s), and/or (3) claim status. For example, the Office event(s) may include (but are not limited to) restrictions, rejections, and/or issuance. The Applicant event(s) may include (but are not limited to) application, amendment, appeal, and/or interference. The claim status may include (but are not limited to) (1) allowed claim(s), (2) rejected claim(s), and/or withdrawn claim(s).

FIG. 1 illustrates an example architecture of the patent matching analysis system 100 (hereinafter also referred to as the system). The system 100 receives a user input of a source patent 110 and/or a court case 120 (e.g., a patent number, a court case number, or parties involved in a court case) and analyzes the received source patent 110 and/or court case 120 to generate one or more reports 130, including (but not limited to) a taxonomy report 132 and/or an ontology report 134. A taxonomy report 132 is a report showing a category to which the source patent belongs and/or whether there are some target patents that are similar to the source patent. An ontology report 134 is a report showing one or more properties and relationships of various elements contained in the related court document(s) and patent document(s).

The system 100 includes a document retriever 102, a natural language processing (NLP) engine 104, a taxonomy engine 106, an ontology engine 108, and a report generator 109. The ellipsis 107 represents that the system 100 may include any additional components for any other purposes, such as a machine learning classifier. The document retriever 102 is configured to retrieve a document based on the input of a user and/or output of the NLP engine 104, taxonomy engine 106, and/or ontology engine 108. For example, the user input may include a patent number or a court case number. Based on the patent number or the court case number, the document retriever 102 identifies a data system that contains patent documents associated with the patent number or court documents associated with the court case number. For example, each country's patent office has its own patent numbering convention. When the patent number includes "US," the document retriever 102 determines that the patent is likely a U.S. patent, and retrieves a patent document associated with the patent number from a data system of the U.S. Patent Office. In some embodiments, the document retriever 102 may further retrieve the prosecution history of the patent. For example, for a U.S. patent, the document retriever 102 may retrieve all the documents contained in the file wrapper of the patent.

The retrieved patent document or court document is then processed via the NLP engine 104. The retrieved patent document or the court document is likely a PDF file. The NLP engine 104 identifies the textual information contained in the PDF file and tags certain relevant portions of the textual information. For example, when the document is a court document, the NLP engine 104 may be configured to identify and tag the title, date, defendant, plaintiff, court, judge, and patent contained in the court document. When the document is a patent document, the NLP engine 104 may be configured to identify and tag title, inventor, application date, issue date, examiner, U.S. class, International Patent Class, cited references, abstract, claims, and summary.

If the court document contains a patent (e.g., a patent number), the NLP engine 104 sends the patent number to the document retriever 102, causing the document retriever 102 to treat the patent contained in the court case as a source patent. Thus, the retrieved patent document is then sent to the NLP engine 104 for further processing as a source patent document.

Next, the processed textual information of the source patent document is further analyzed and processed by the taxonomy engine 106 and the ontology engine 108. The taxonomy engine 106 is configured to identify one or more target patents that are similar to the source patent 110 or the patent contained in the court case 120. The ontology engine 108 is configured to determine properties and relationships of various elements contained in the related court document and patent document(s). For example, the ontology information of a court document may include (but not limited to) title, date, defendant, plaintiff, court, judge, one or more other court cases associated with the court case, and/or one or more patents associated with the court case; and the ontology information of a patent document may include (but is not limited to) title, inventor, date, examiner, U.S. Class, International Patent Class, field of search, claims, abstract, cross references, or cited references. The ontology information of prosecution history may include (but is not limited to) (1) Office event(s), (2) Applicant event(s), and/or (3) claim status. For example, the Office event(s) may include (but are not limited to) restrictions, rejections, and/or issuance. The Applicant event(s) may include (but are not limited to) application, amendment, appeal, and/or interference. The claim status may include (but is not limited to) (1) allowed claim(s), (2) rejected claim(s), and/or withdrawn claim(s). The analysis results of the taxonomy engine 104 and/or the ontology engine 108 are then sent to the report generator 109 to generate a taxonomy report 132 and/or an ontology report 134.

In some embodiments, the taxonomy engine 106 and the ontology engine 108 may be configured to feed data to each other. For example, the identified target patents (by the taxonomy engine 106) may be sent to the ontology engine 108 to further extract ontology information of the target patents. As another example, the ontology engine 108 may identify cross references and/or cited references (e.g., patents), and send the cross-referenced or cited patents to the taxonomy engine 106 to further identify patents that are similar to the cross-referenced and/or cited patents. However, it is not necessary that the system 100 includes both taxonomy engine 106 and ontology engine 108. In some embodiments, the taxonomy engine 106 and ontology engine 108 may be implemented at two separate computing systems that may be connected or not connected to each other.

Figure 2:
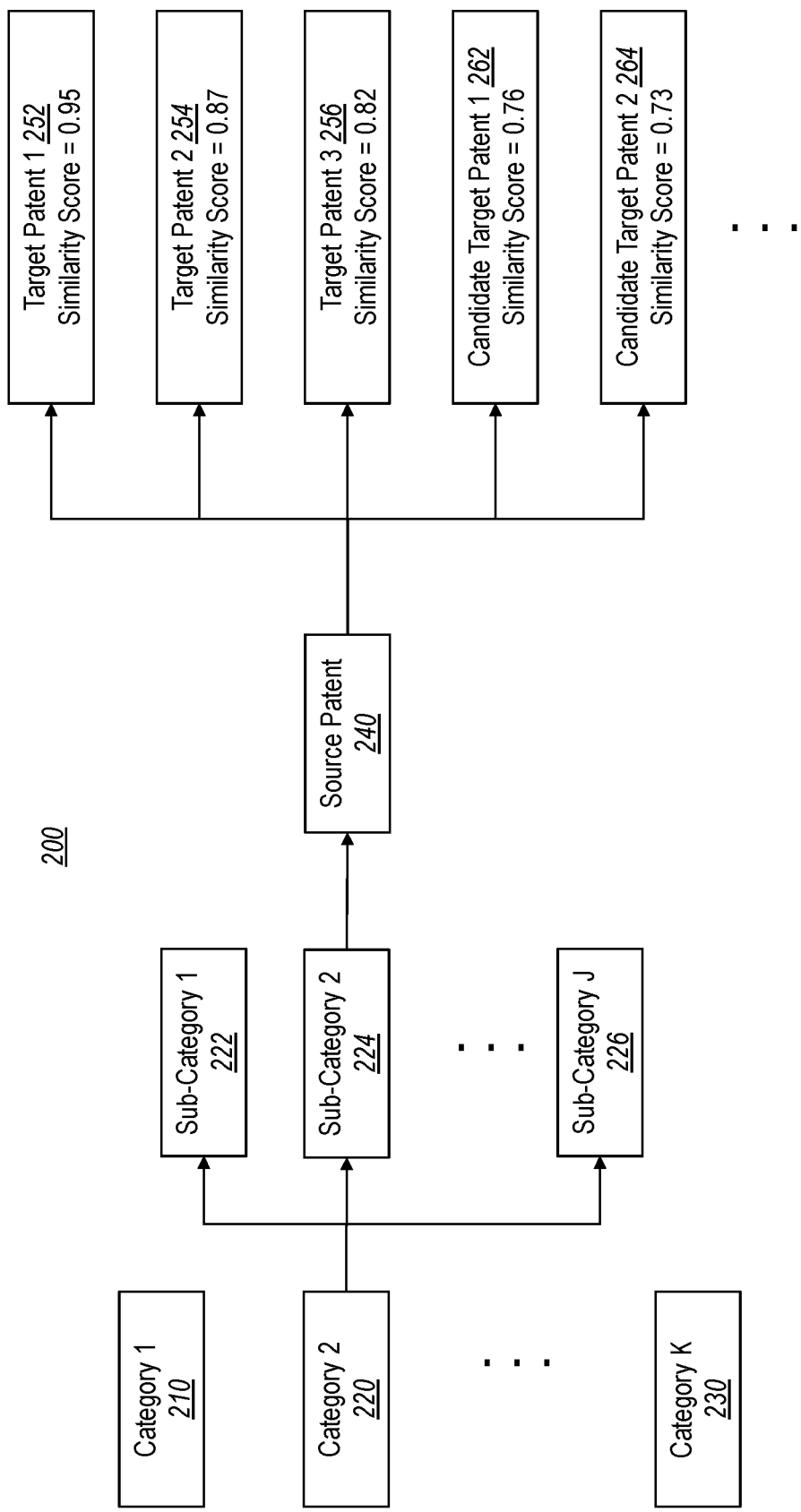
FIG. 2 illustrates an example taxonomy report that may be generated by the patent matching analysis system.

FIG. 2 illustrates an example taxonomy report 200 that may be generated based on the analysis results of the taxonomy engine 106. The taxonomy report 200 shows a list of K categories, including category 1 210, category 2 220, through category K 230, that a patent document may belong to. Each of the top categories may further include a list of sub-categories. For example, as illustrated in FIG. 2, the category 2 200 further includes a list of J sub-categories 1-J (including sub-category 222, sub-category 224, through sub-category J 226). The taxonomy report 200 shows that the source patent 240 belongs to the sub-category 2 224 of the category 2 220. Further, the taxonomy report 200 also shows a list of target patents, including patent 1 252, patent 2 254 and patent 3 256, each of which has a similarity score. The higher the score, the more similar the target patent is to the source patent 240.

In some embodiments, the taxonomy engine 106 first identifies a plurality of candidate patents, and compares each of the plurality of candidate patents with the source patents to determine a similarity score. For example, the similarity scores may be ranged between 0 and 1. In such a case, when the two patents are identical, the similarity score is 1. When the two patents are completely different, the similarity score is 0. Based on the determined plurality of similarity scores, the taxonomy engine 106 then identifies the target patents. In some embodiments, when the similarity between the source patent and the candidate patent is greater than a predetermined threshold (e.g., 0.8), the taxonomy engine 106 determines that the candidate patent is a target patent. Alternatively, or in addition, the taxonomy engine 106 identifies a predetermined number (e.g., top three) of candidate patents that have the highest similarity scores to be the target patents. As illustrated in FIG. 2, the taxonomy report shows three target patents 252, 254, and 256, each of which has a similarity score 0.95, 0.87, or 0.82. The taxonomy report further shows additional candidate patents 262 and 264 that have fairly high similarity scores 0.76 and 0.73.

Various methods may be implemented at the taxonomy engine 106 for identifying a plurality of candidate patents. In some embodiments, the taxonomy engine 106 may traverse each patent in the data systems, i.e., treat every patent as a candidate. Although such embodiments will generate accurate and complete results, a large amount of computation and hardware resources are required to implement the embodiments.

Alternatively, in some embodiments, the taxonomy engine 106 may limit the candidate patents to be those that have an application date between a predetermined period (e.g., within 5 years of the source patent's application date). In some embodiments, the taxonomy engine 106 may also limit the candidate patents to be those that have an assignee that is on a predetermined list of entities. In some embodiments, the NLP engine 104 may first identify a list of keywords associated with the source patent, and the taxonomy engine 106 limits the candidate patents to be those that share the list of keywords. In yet some embodiments, the NLP engine 104 may also identify at least one of (1) an international class, (2) a U.S. class, or (3) a field of search of the source patent, and the taxonomy engine 106 may limit the candidate patents to be those that share at least one of (1) the international class, (2) the U.S. class, or (3) the field of search of the source patent.

As briefly discussed above, when the candidate patents are identified, each of the candidate patents is compared with the source patent. However, since the candidate patents and the source patent are fairly unstructured text documents, it is difficult to compare the two sets of textual information directly. In some embodiments, before the comparison is performed, a set of features is first extracted from each of the candidate patents and the source patent. A feature is a relevant parameter that can be used to describe a patent document. Each set of features may then be represented by an object (e.g., a vector) that has a predetermined data structure. The object represents the features of the source patent, and the objects represent the features of the candidate patents may then be compared to determine a similarity score. Various embodiments may be implemented to extract features and transform the features into a structured object.

In some embodiments, a dictionary of a plurality of relevant words is first constructed. Each of the plurality of words in the dictionary may be treated as a potential feature. To extract features from a text document, each word in the text document is traversed and compared with the dictionary. When a word in the text document is included in the dictionary, a count for the word is added by one. The result of traversing each word in the text document may then be recorded in a structured object (e.g., a list, vector, and/or a matrix).

FIG. 3A illustrates an example dictionary 300A including 7 words. FIG. 3B illustrates an example text document 300B. FIG. 3C illustrates an example matrix 300C generated based on the dictionary 300A of FIG. 3A and the text document 300B of FIG. 3B. As illustrated in FIG. 3A, the dictionary 300A contains 7 words, including "compute", "processor", "classify", "natural", "language", "machine", and "learning". As illustrated in FIG. 3B, the text of a text document 300B includes "a computing system comprising: one or more processors; and one or more computer readable media having stored thereon computer executable instructions that are structured such that, when executed by the one or more processors . . . " Based on the texts in the text document 300B, a matrix 300C shown in FIG. 3C is generated. For example, the word "computing" and "computer" show up three times in the text of the patent, thus, the counter of the word "compute" is increased to 3. As another example, the word "processors" shows up twice, the counter of the word "processor" is increased to 2. Note, the NLP engine 104 is capable of treating different words with a same stem as the same. For example, the word "computing", "computer", "compute", "computers" may be processed and treated by the NLP engine 104 as a same word stem. As another example, the word "processor" and "processors" may be treated by the NLP engine 104 as a same word stem.

FIGS. 3A through 3B merely show a simplified dictionary and simplified text document. Similar principles may be implemented in a dictionary containing thousands of words and a real patent document that contains thousands of words. In such a case, a matrix generated for representing a real patent document would include thousands of elements. Further, since the same dictionary is used to extract features in the source patent document and candidate patent documents, the generated matrixes for any source patent and/or candidate patents would have a same number of elements (i.e., a same number of features).

These structured objects (e.g., lists or matrixes) may also be called and treated as vectors. For example, each word in the dictionary may be deemed as a separate dimension. A vector representing the source patent can then be compared with a vector representing a target candidate patent. A similarity between the two vectors may then be calculated. Different embodiments (e.g., cosine similarity, Euclidean distance, dot product) may be implemented to calculate similarities between two vectors. In some embodiments, once the source patent and a plurality of candidate patents are identified, a set of features are extracted from each of the source patent and the plurality of candidate patents, and each set of the features is transformed to a vector. The vector representing the source patent is compared to each vector representing each candidate patent to determine a similarity score. In some embodiments, when the similarity score is greater than a predetermined threshold, the candidate patent is identified as a target patent. In some embodiments, a predetermined number of candidate patents that have the highest similarity scores are identified as a target patent.

As described above, in some embodiments, the plurality of candidate patents may be identified based on the application date, the assignees, the words contained in the patents, and/or international patent class or U.S. class of the patents. Alternatively, the plurality of candidate patents may be identified based on a taxonomy system built using machine learning. In some embodiments, the taxonomy system may be built by the taxonomy engine 106 and/or the patent matching analysis system 100 of FIG. 1. In some embodiments, the taxonomy system may be built by a separate computing system and made available to the patent matching analysis system 100. Various machine learning technologies may be implemented to build the taxonomy system. In some embodiments, hierarchical classification is used to build the taxonomy system.

Figure 4:
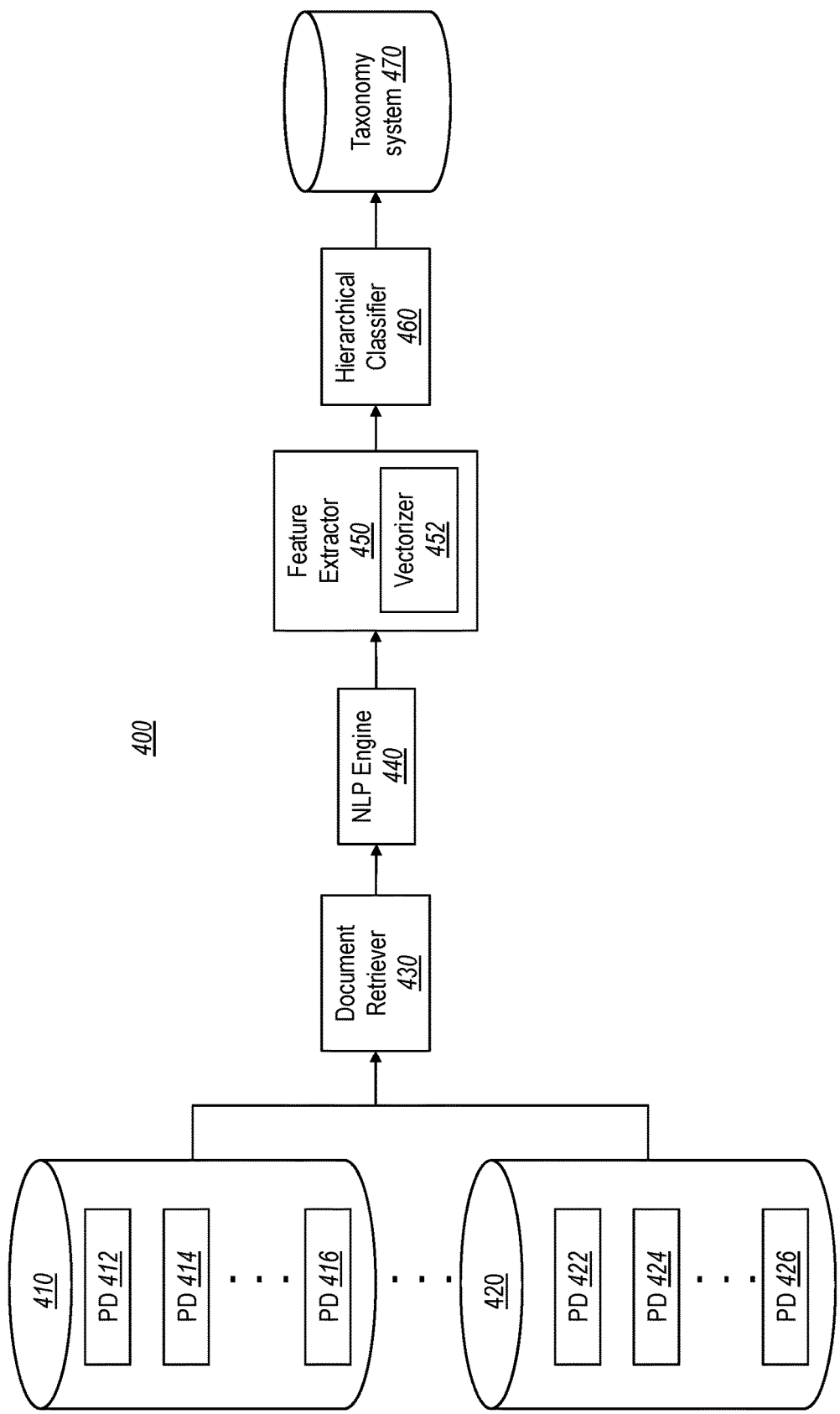
FIG. 4 illustrates an example architecture of a taxonomy builder.

FIG. 4 illustrates an example architecture of a taxonomy builder 400 that is configured to use hierarchical classification machine learning to generate the taxonomy system. The taxonomy builder 400 includes a document retriever 430, an NLP engine 440, a feature extractor 450, and hierarchical classifier 460. In some embodiments, the taxonomy builder 400 may be part of the patent matching analysis system 100. In such a case, the document retriever 430 and the NLP engine 440 may correspond to the document retriever 102 and the NLP engine 104 of the patent matching analysis system 100.

The document retriever 430 is configured to retrieve a plurality of patent documents from one or more data systems 410, 420 that publish patent documents. The one or more data systems 410 and 420 may be patent data systems of different countries (e.g., U.S. Patent Office, Canadian Patent Office, European Patent Office). In some embodiments, the document retriever 430 retrieves each document 412, 414, 416 and 422, 424, and 426) in each of the one or more data systems 410 and 420. In some embodiments, the document retriever 430 retrieves a substantial portion of patent documents (e.g., 10% or a predetermined number of randomly selected patent documents) in each of the data systems 410 and 420.

The retrieved patent documents are then fed to the NLP engine 440 to extract textual information. The NLP engine 440 is configured to extract textual information from each retrieved patent document (e.g., pdf files). The NLP engine 440 may also be configured to extract a stem of each word, which ignores the suffix in the word, such as "ing", "ly", "ed", "ious", "ies", "ive", "es", "s", "ment", etc.

The processed word stems of each patent document are then sent to the feature extractor 450 to obtain features associated with the corresponding document. Based on the extracted features, the patent documents can then be classified into different categories. Different embodiments may be implemented to extract different features. In some embodiments, the feature extractor 450 further includes a vectorizer 452. The vectorizer 452 is configured to transform the extracted features into a vector. Similar to the process described above in FIGS. 3A through 3C, the feature extractor 450 and the vectorizer 452 may use a dictionary of a plurality of words to generate a vector for each document based on the frequency of each word stem occurred in the patent document. In some embodiments, the dictionary of the plurality of words may be predefined. Alternatively, the dictionary of the plurality of words may be constructed based on the words in the patent documents. In some embodiments, the vectorizer 452 may give different word stem a different weight. For example, the word "the" may be given no or little weight. As another example, the word "ML" or "processor" may be given a greater weight.

The generated vectors are analyzed by the hierarchical classifier 460 to build the taxonomy system 470. Various methods may be implemented by the hierarchical classifier 460. In some embodiments, the hierarchical classifier 460 starts from treating each vector as its own group or category. The hierarchical classifier 460 then identifies two vectors that are the closest or most similar to each other, and group the two closest vectors in a group or category. Next, the hierarchical classifier 460 then identifies a next two vectors that are the closest or most similar to each other. This process repeats until all the vectors are grouped into one single group or category—the process of hierarchical classification groups the vectors in many categories in different hierarchies.

Figure 5:
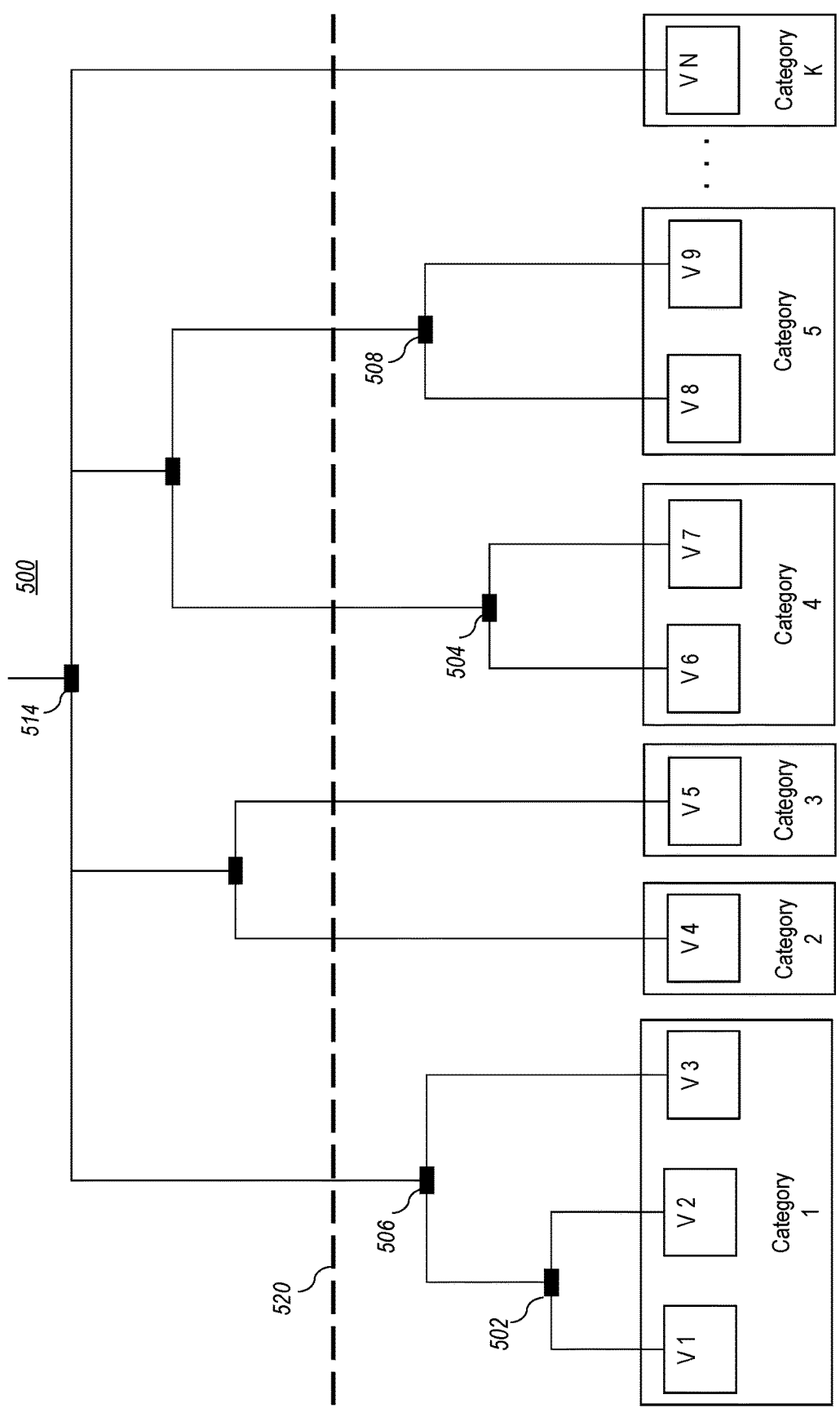
FIG. 5 illustrates an example taxonomy system, in which a plurality of vectors are classified by a hierarchical classifier.

FIG. 5 illustrates an example taxonomy system 500, in which a plurality of vectors (corresponding to a plurality of patent documents) are classified by a hierarchical classifier (e.g., the hierarchical classifier 460 of FIG. 4). The classified vectors V1 through VN, each of which represents a patent document. First, the hierarchical classifier 460 first identifies a pair of vectors that are the closest to each other among the N vectors. Here, vectors V1 and V2 are the closest vectors. The closeness between vectors V1 and V2 is represented by joining them with vertical lines and a join 502. The height of the vertical lines of the join 502 represents the similarity between vectors V1 and V2, i.e., the shorter the lines, the more similar vectors V1 and V2 are. Next, the hierarchical classifier 460 then identifies a next pair of closest vectors among the N vectors. Here, vectors V6 and V7 are the next closes pair. The closeness between vectors V6 and V7 is also represented by joining them with vertical lines and a join 504. The height of the vertical lines of the join 504 also represents the similarity between vectors V6 and V7. This process repeats until all the vectors are linked together via the top join 514. The iterative process of the hierarchical classification eventually generates a taxonomy system 500.

As shown in FIG. 5, the taxonomy system 500 classifies the patents in categories in different hierarchies. How many categories (i.e., the granularity of the categories) are to be used or presented to a user may be customized by a user or determined by the hierarchical classifier 460. For example, a user may define that patents contained in each category must have a similarity score higher than a predetermined threshold. In such a case, a line (e.g., a dotted line 520) may be drawn at a height that represents the predetermined threshold of similarity score. The top joins (e.g., categories 1 through K) under the dotted line 520 are the indications of the final categories presented to the user. As illustrated in FIG. 5, category 1 includes all the vectors (i.e., vectors V1 through V3) under join 506. Each of the vectors V4 and V5 is its own category. Category 4 includes vectors V6 and V7 that are linked by join 504, and category 6 includes vectors V8 and V9 that are linked by join 508. For each identified category, a category vector may then be generated to represent the category. In some embodiments, a centroid of the vectors in each category may be used as a category vector. For example, for category 1 in FIG. 5, the centroid of vectors V1, V2, and V3 may be calculated and used as a category vector for category 1.

In some embodiments, each of the patent documents in the one or more data systems 410, 420 is analyzed directly in the process of the hierarchical classification. Alternatively, only a portion of the patent documents (e.g., 20% or a predetermined number of randomly selected patent documents) in the one or more data systems 410, 420 are analyzed directly in the process of the hierarchical classification to generate the taxonomy system. Each of the rest of the patent documents (e.g., 80% of the patent documents) may then be assigned to one of the categories in the taxonomy system. Similarly, when a new patent application is published or a new patent is issued, the new patent document may also be assigned to one of the categories in an existing taxonomy system as well.

Figure 6:
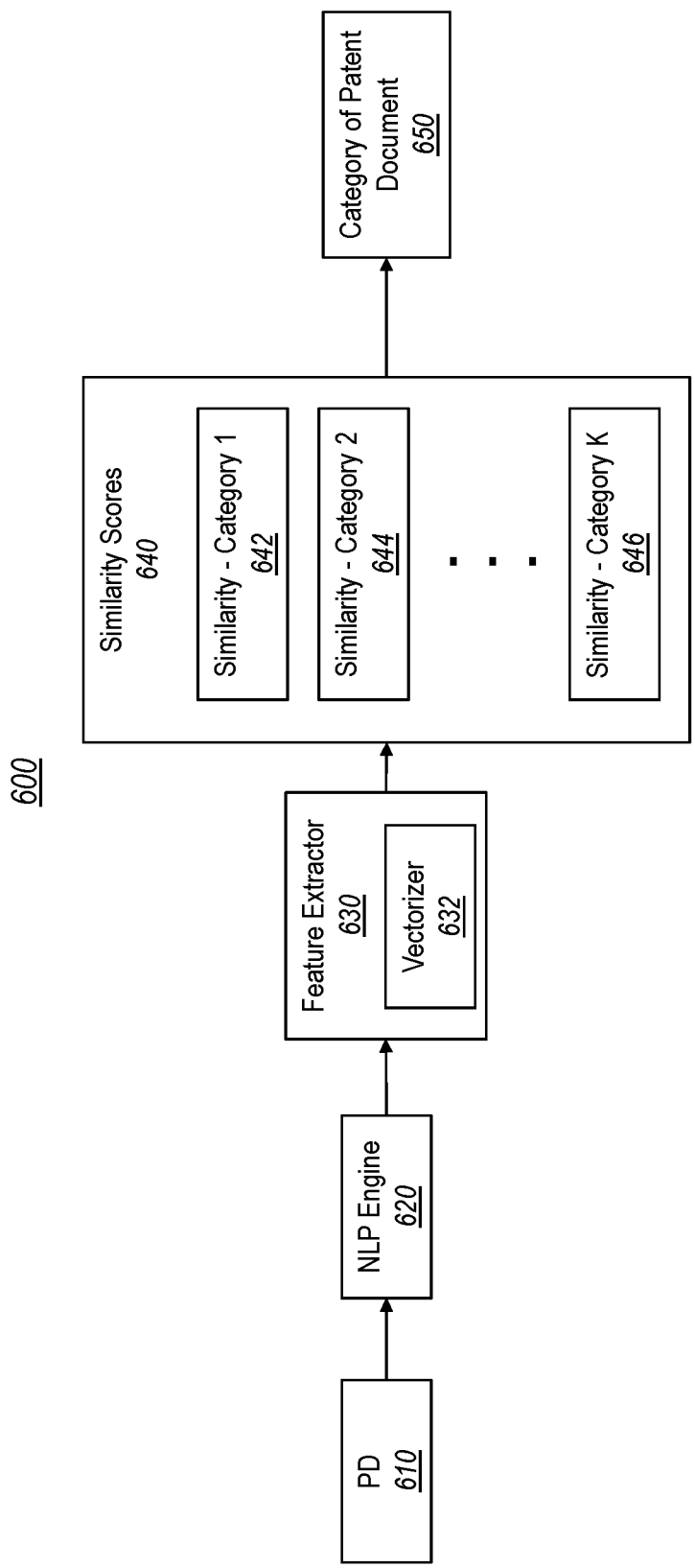
FIG. 6 illustrates an example process for assigning an uncategorized patent document to one of a plurality of categories in an existing taxonomy system.

FIG. 6 illustrates an example process 600 for assigning a patent to one of a plurality of categories in an existing taxonomy system (e.g., the taxonomy system 500). First, a patent document 610 (corresponding to the uncategorized patent) is retrieved, the patent document 610 is processed by an NLP engine 620 to extract textual information of the patent document. The extracted textual information is then sent to a feature extractor 630 to extract relevant features. The features may also be transformed into a vector by a vectorizer 632. The feature extractor 630 and the vectorizer 632 may correspond to the feature extractor 450 and the vectorizer 452 of FIG. 4.

The vector representing the patent document is then compared with each of the category vectors to identify a similarity (e.g., a similarity score 642, 644, or 646). For example, the similarity score 642 represents a similarity between the set of patent features and the set of category features corresponding to category 1, the similarity score 644 represents a similarity between the set of patent features and the set of category features corresponding to category 2, and so on. The multiple similarity scores 640 may then be ranked to identify a highest similarity score, which indicates that the corresponding category vector is the most similar to the patent vector. The category corresponding to that category vector (that is the most similar to the patent vector) is then identified as the category of the patent 650. Once all the patents are assigned to a category, the building of the taxonomy system is complete. Note, however, the building of the taxonomy system is an ongoing process, since there are always new patents issued and new patent application filed. Whenever a new patent document (including issued patent and published patent application) is published, the taxonomy system retrieves the newly published document and assigns the newly published patent document into one of the plurality of categories in the taxonomy system.

Once the taxonomy system 500 is built, the taxonomy system 500 may then be used to identify a plurality of candidate patents. If the source patent is already assigned a category in the taxonomy system, the category of the source patent may be immediately identified, and all the patents within the same category may be deemed as target patents. If the source patent has not been classified in a category in the taxonomy system, the taxonomy system 500 may then classify the source patent into one of the plurality of categories as illustrated in FIG. 6.

Referring back to FIG. 1, in some embodiments, the patent matching analysis system 100 also includes an ontology engine 108 that is configured to extract ontology information of related court cases and patents (e.g., patent documents and prosecution history). Information associated with ontology of a court document includes (but is not limited to) title, date, defendant, plaintiff, court, judge, one or more other court cases associated with the court case, and/or one or more patents associated with the court case. Information associated with ontology of a patent document includes (but is not limited to) title, inventor, date, examiner, U.S. Class, International Patent Class, field of search, claims, abstract, cross references, or cited references. Information associated with ontology of prosecution history of a patent includes (but is not limited to) (1) Office event(s), (2) Applicant event(s), and/or (3) claim status. For example, the Office event(s) may include restrictions, rejections, and/or issuance events. The Applicant event(s) may include application, amendment, appeal, and/or interference events. The claim status may include (1) allowed claim(s), (2) rejected claim(s), and/or withdrawn claim(s). The extracted ontology information is then processed by the report generator 109 to generate an ontology report 134.

Figure 7:
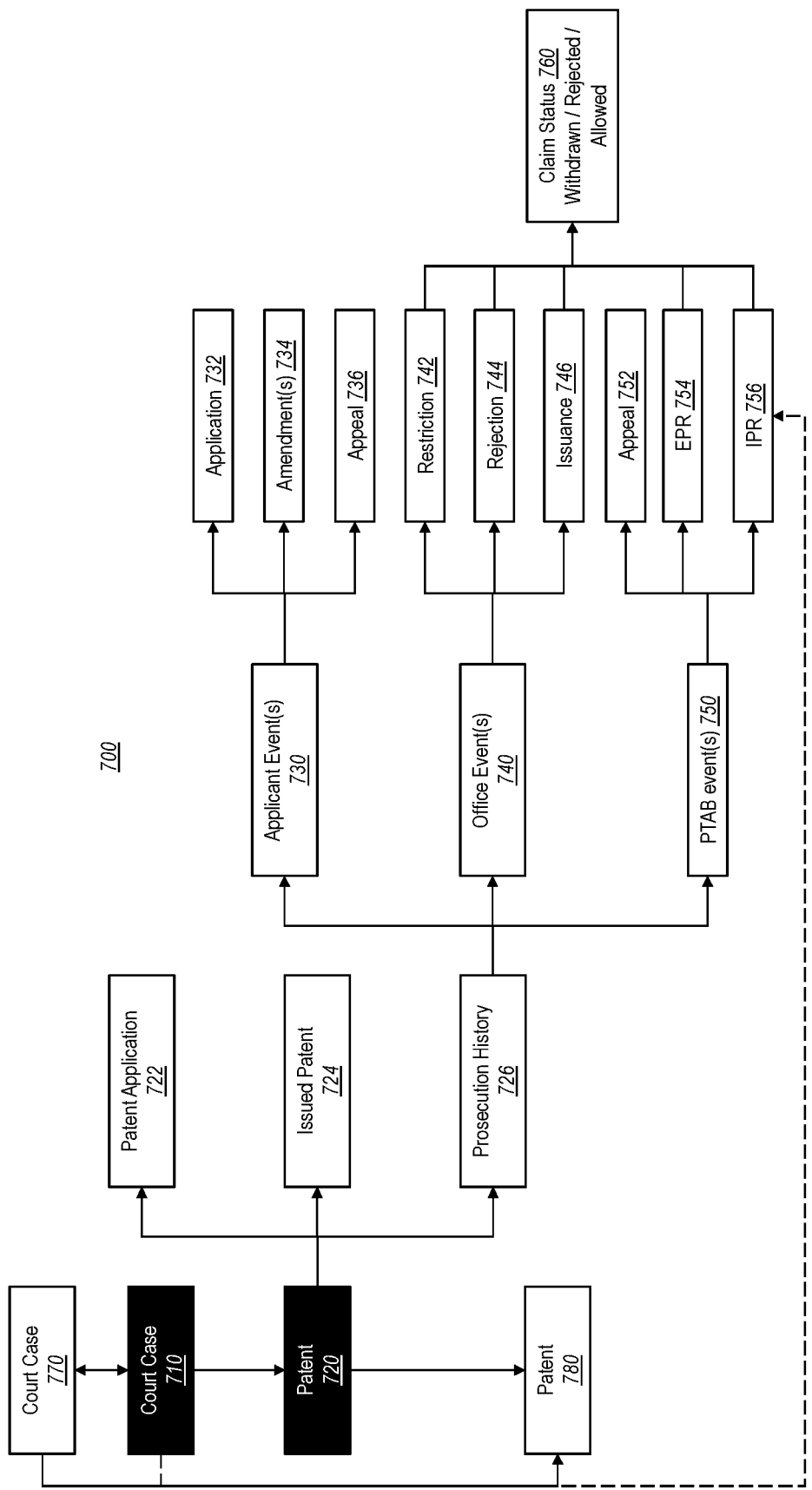
FIG. 7 illustrates an example ontology report that organizes and visualizes ontology information of related court cases and patent cases.

FIG. 7 illustrates an example ontology report 700 that organizes and visualizes ontology information of related court cases and patent cases. As illustrated in FIG. 7, a user may first input a court case 710, which corresponds to the court case 120 of FIG. 1. Alternatively, a user may input a source patent 720 (which corresponds to the source patent 110 of FIG. 1) directly. The document retriever 102 retrieves a court document/patent document associated with the court case 710/source patent 720, and the NLP engine 104 processes the retrieved court document (e.g., a pdf file) to extract textual information contained in the court document/patent document.

When the user input is a court case 710, the ontology engine 108 identifies various ontology information associated with the court case 710, including (but not limited to) title, date, judge, plaintiff, defendant, other related case(s), and/or related patents. In some embodiments, when a user clicks court case 710, a visualization including the ontology information of the court case 710 may be presented to a user.

When the ontology engine 108 identifies information related to a patent (e.g., patent 720) in the textual information of the court document, the identified patent may then be deemed as the source patent 720. For the source patent 720 (which may be input directly by a user or extracted from the court document by the ontology engine 108), the ontology engine 108 further causes the document retriever 102 to retrieve the patent document associated with the source patent 720. The retrieved patent document may include (but not limited to) published patent application 722, issued patent 724, and prosecution history 726. The ontology engine 108 may further parse the textual information contained in each of the patent application 722, issued patent 724, and prosecution history 726 to obtain additional ontology information.

For example, in some embodiments, based on the textual information of the prosecution history 726, the ontology engine 108 identifies various events 730, 740, 750 triggered by an applicant, an examiner, and/or Patent Trial and Appeal Board (PTAB). The applicant event(s) 730 may include (but are not limited to) application event 732 (e.g., a date the applicant filed the application, and the filed application), amendment event(s) 734 (e.g., a date when an amendment was filed, and the filed amendment document(s)), appeal event(s) 736 (e.g., a date when an appeal was filed, and the filed appeal document(s)). The Office event(s) 740 may include (but are not limited to) restriction event(s) 742 (e.g., a date when a restriction requirement was issued, and the document associated with the restriction), rejection event(s) 744 (e.g., a date when an office action was issued, the office action document, cited references, rejected claims, etc.), and issuance event 746 (e.g., a date when the patent is allowed or the patent is issued, the final claims, and the allowance and/or issuance document). The PTAB event(s) 750 may include (but are not limited to) an appeal result 752 (e.g., disposition of the appeal, a date when the PTAB decided the case, judges who decided the case, a document issued by the PTAB, etc.), ex parte reexamination (EPR) event 754, and inter partes review (IPR) 756. The Office events 740 and the PTAB events 750 may also trigger claim status changes 760. For example, after a rejection event 744, certain claims may be withdrawn or cancelled. Alternatively, or in addition, certain claims may be allowed.

Additionally, based on the textual information of the patent application 722, the issued patent 724, or the prosecution history 726, the ontology engine 108 may further identify other related patents (e.g., patent 780). For example, the related patent 780 may be a parent patent listed in the cross references section of the patent application 722. As another example, the related patent 780 may be a patent cited in an office action. Similarly, based on the textual information of the court case 710, the ontology engine 108 may further identify other related court case(s) 770. The other related court case 770 may also be analyzed by the ontology engine to identify additional related patents 780. Similarly, the related patent 780 (identified by the court case 710 or by the source patent 720) may also be analyzed by the ontology engine 108 to generate a similar information graph (not shown) as that shown for patent 720.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
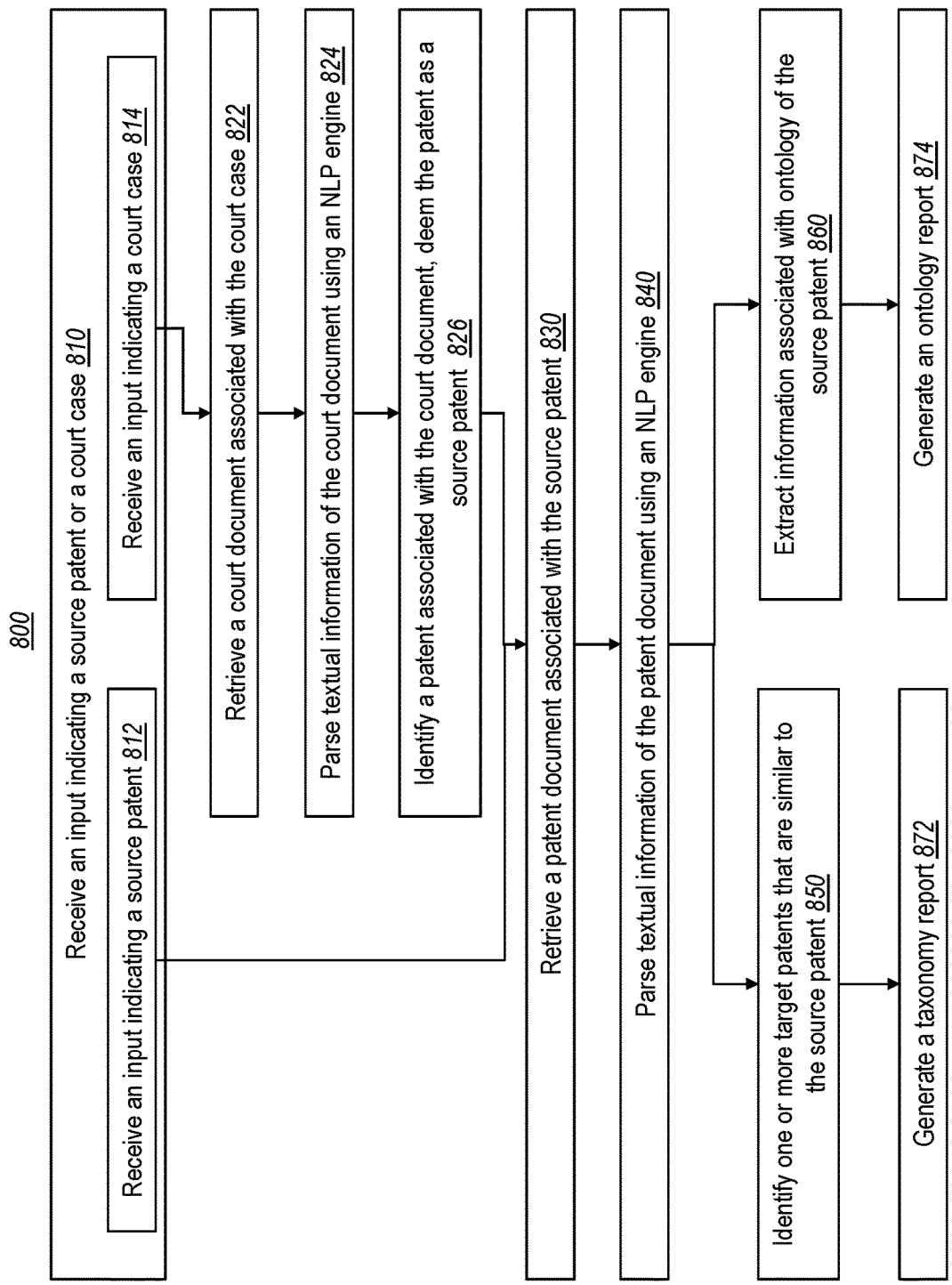
FIG. 8 illustrates a flowchart of an example method for analyzing court cases and related patents to generate a taxonomy report and/or an ontology report.

FIG. 8 illustrates a flowchart of an example method 800 for analyzing court cases and related patents to generate a taxonomy report and/or an ontology report, which may be implemented at the patent matching analysis system 100 of FIG. 1. The method 800 includes receiving an input indicating a source patent or a court case (act 810). When an input indicates a court case (act 814), a court document associated with the court case is retrieved (act 822). Textual information of the court document is then parsed by an NLP engine (act 824). Based on the parsed textual information of the court document, a patent associated with the court document is identified (act 826). The identified patent is then treated as a source patent.

When an input indicates a source patent (act 812), or a source patent is identified from the court document (act 826), a patent document associated with the source patent is retrieved (act 830). Textual information of the retrieved patent document is parsed by an NLP engine (act 840). Based on the parsed textual information of the patent document, one or more target patents that are similar to the source patent are identified (act 850). Based on the identified one or more target patents, a taxonomy report is generated (act 872). Alternatively, or in addition, based on the parsed textual information of the patent document, information associated with ontology of the source patent may be extracted (act 860), and an ontology report is generated based on the extracted ontology information (act 874).

Figure 9:
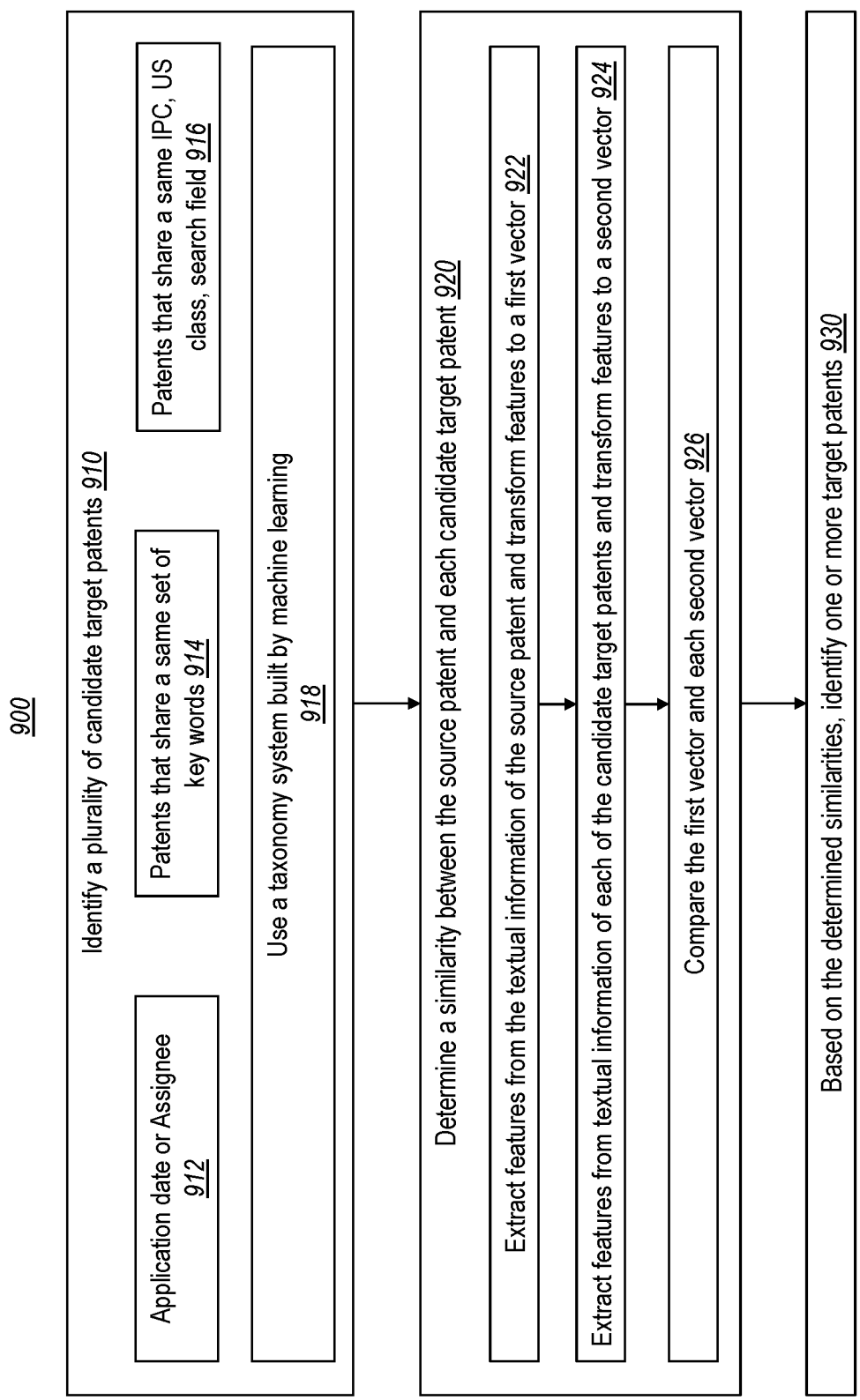
FIG. 9 illustrates a flowchart of an example method for identifying one or more target patents.

FIG. 9 illustrates a flowchart of an example method 900 for identifying one or more target patents, which corresponds to the act 850 of FIG. 8. The method 900 includes identifying a plurality of candidate patent (act 910). In some embodiments, identifying the plurality of candidate patents may be based on an application date or an assignee of the patents (act 912). For example, based on the application date of the source patent, a period (e.g., within 5 years of the application date of the source patent) may be determined, and only the patents that have an application date within the determined period are identified as candidate patents. As another example, the patents that have an assignee that is within a predetermined list are identified as candidate patents (act 914). Alternatively, or in addition, the patents that share a same set of keywords and/or patents that share a same International Patent Class (IPC) or U.S. patent class may be identified as candidate patents (act 916). In yet some embodiments, candidate patents are identified by using a taxonomy system built by machine learning (act 918).

Once the plurality of candidate patents are identified (act 910), for each of the plurality of candidate patents, a similarity between the source patent and each candidate patent is determined (act 920). In some embodiments, determining a similarity between the source patent and each candidate patent includes (1) extracting a set of features from textual information of the source patent and transforming the set of features into a vector (act 922), (2) extracting a set of features from textual information of each of the candidate patents and transforming the set of features into a second vector (act 924), and (3) comparing the first vector with each of the second vectors to determine a similarity (e.g., a similarity score) (act 926). Finally, based on the determined similarities, one or more target patents are identified (act 930). For example, in some embodiments, the target patents are those patents with a similarity score that is greater than a predetermined threshold. Alternatively, or in addition, the target patents are those patents that have a top predetermined number of similarity scores.

Figure 10:
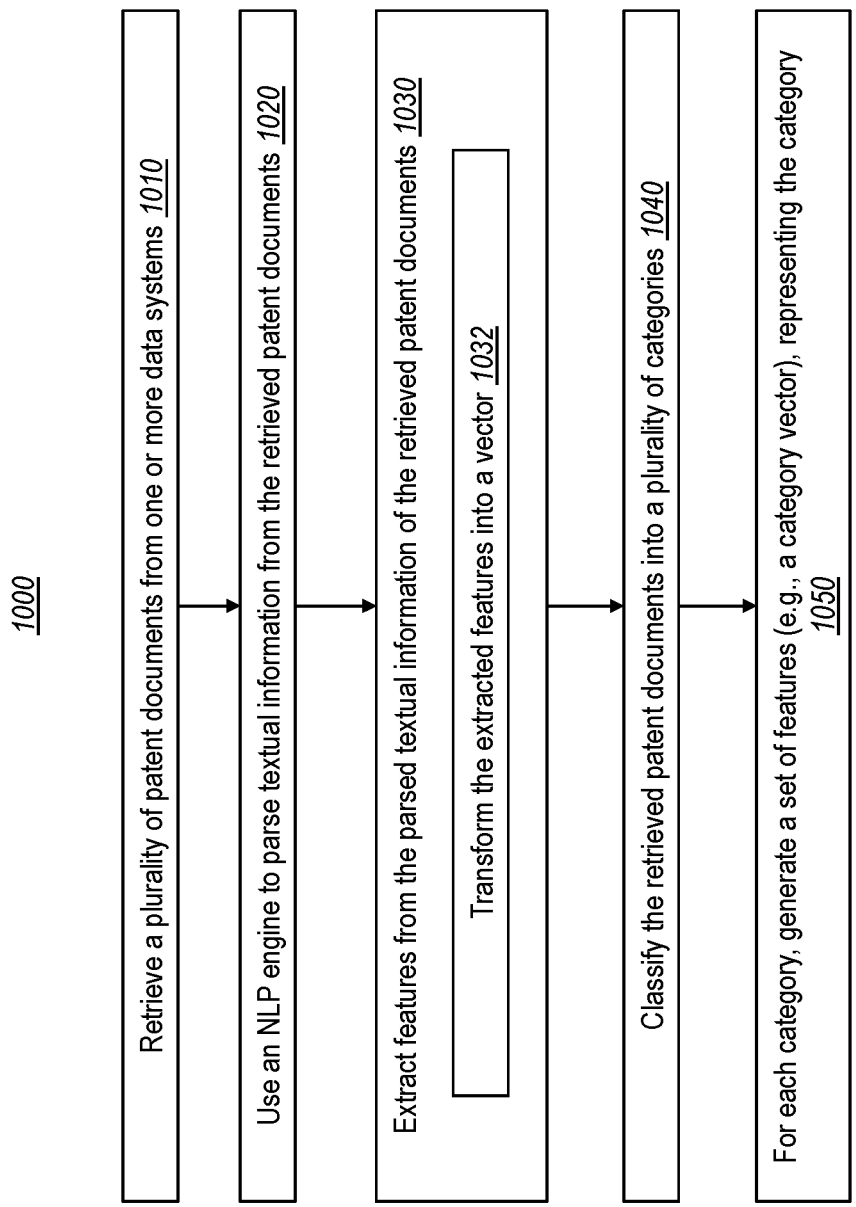
FIG. 10 illustrates a flowchart of an example method for building a taxonomy system by machine learning.

FIG. 10 illustrates a flowchart of an example method 1000 for building a taxonomy system by machine learning. The taxonomy system may be used by the act 918 of FIG. 9. Method 1000 includes retrieving a plurality of patent documents from one or more data systems (act 1010). In some embodiments, all the patents in the one or more data systems are retrieved. In some embodiments, a substantial portion (e.g., 10%, 20%) of the patents in one or more data systems are retrieved. The method further includes using an NLP engine to parse textual information from each of the retrieved patent documents (act 1020) and extracting a set of features from the parsed textual information of the retrieved patent documents (act 1030). In some embodiments, extracting the set of features also includes transforming the extracted set of features into a vector (act 1032). Based on the extracted features, the retrieved patent documents are then classified into a plurality of categories (act 1040). In some embodiments, the classification is performed via using machine learning hierarchical classification algorithms. In some embodiments, for each category, a set of features (e.g., a category vector) are generated to represent the category (act 1050). For example, a centroid of all the set of features (e.g., patent vectors) within a category may be used as a category feature set (e.g., category vector) to represent the category.

Figure 11:
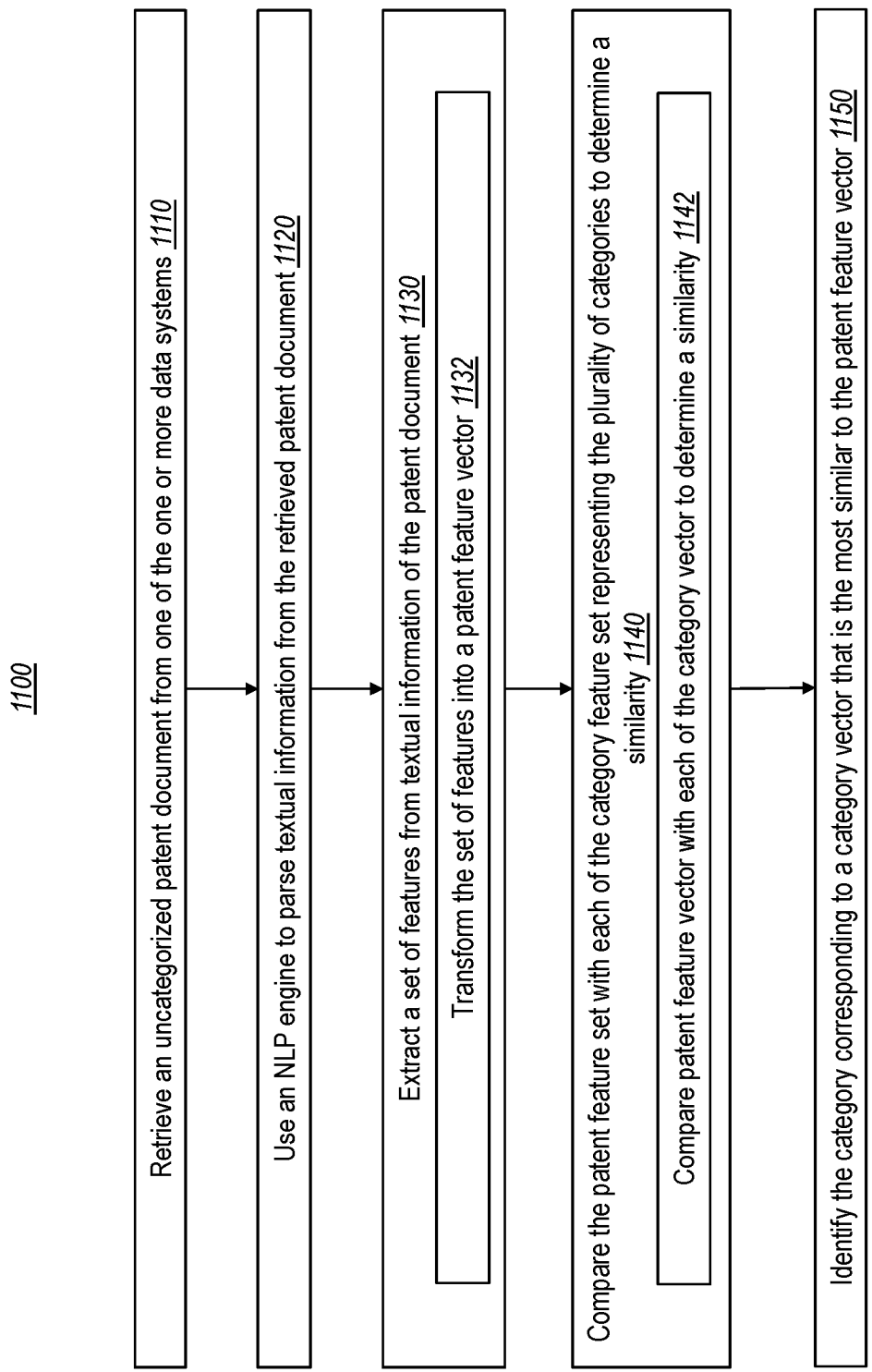
FIG. 11 illustrates a flowchart of an example method for assigning an uncategorized patent document to one of a plurality of categories in an existing taxonomy system.

FIG. 11 illustrates a flowchart of an example method 1100 for assigning an uncategorized patent to one of a plurality of categories in a taxonomy system. When the taxonomy system is built based on a portion of patent documents in the one or more data systems, the rest of the patent documents may use this method to be assigned to a category. Further, this method may also be performed on the newly published patent documents or a source document that has not been assigned to a category.

The method 1100 includes retrieving an uncategorized patent document from one of the one or more data systems (act 1110) and using an NLP engine to parse textual information from the retrieved patent document (act 1120). Next, a set of features is extracted from the textual information of the patent document (act 1130). In some embodiments, extracting the set of features includes transforming the extracted set of features into a patent feature vector (act 1132). The patent feature vector is then compared with each category feature set to determine a similarity between the source patent feature set and the category feature set (act 1140). When the feature set is represented by a patent feature vector, the patent feature vector of the source patent and each category vector are compared to determine their similarity (e.g., a similarity score) (act 1142). In some embodiments, the determined similarities are ranked to identify the highest similarity. The category corresponding to a feature set or vector that is the most similar to the set of patent features or vector is identified to be the category to which the patent belongs (act 1150).

Figure 12A:
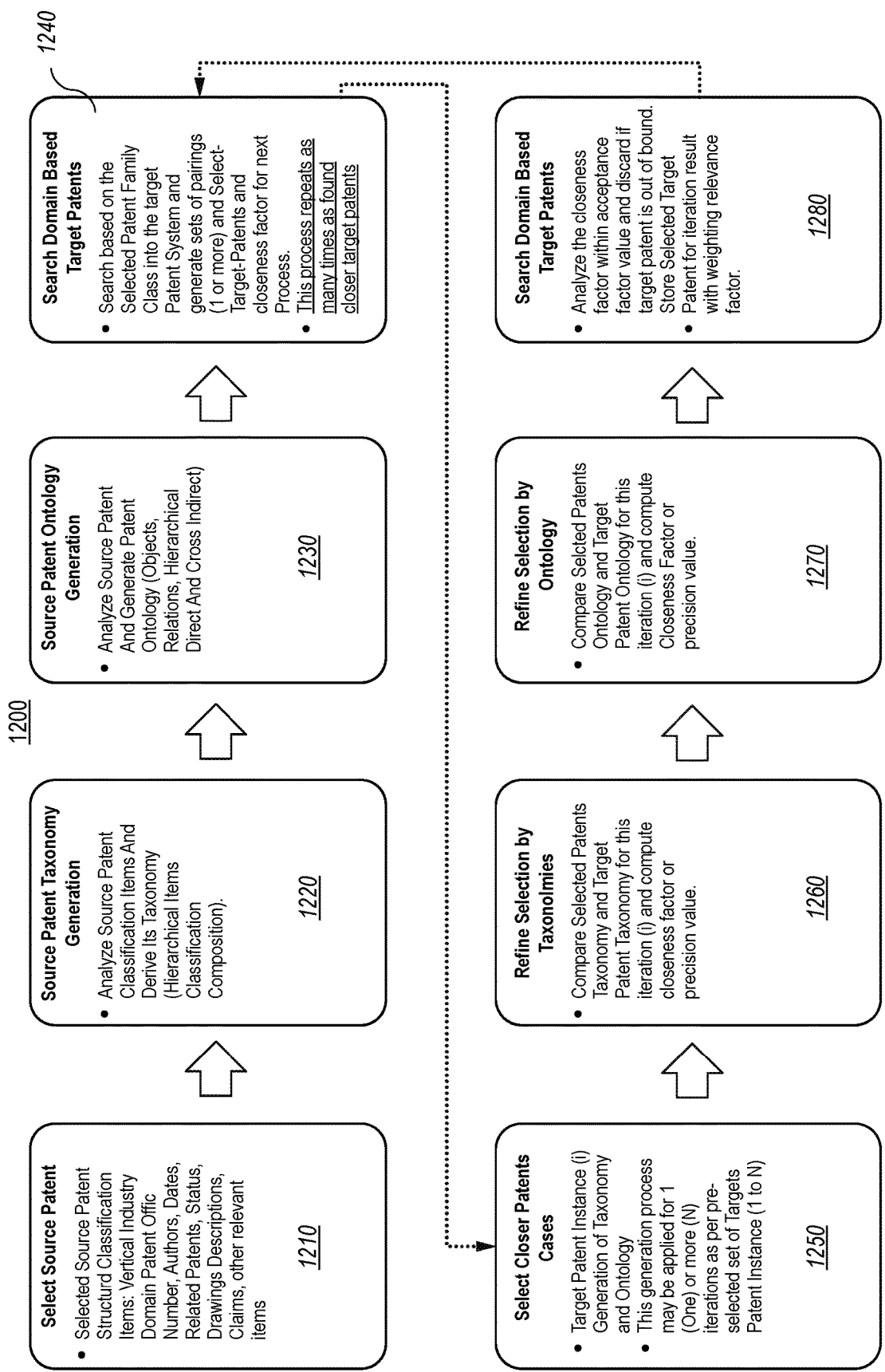
FIGS. 12A through 12E illustrate additional example embodiments of the patent matching analysis.

FIGS. 12A through 12E further illustrate additional example embodiments of the patent matching analysis system 100. FIG. 12A illustrates an example recursive process 1200 that the patent matching analysis system may perform. First (in act 1210), the patent matching analysis system selects a source patent, which may be based on an input of the court case or input of the patent case. The source patent is analyzed to extract classification items (e.g., a set of features) associated with the source patent, including vertical industry domain, patent office number, inventors, dates, related patents, status, drawing descriptions, claims, and other relevant items contained in the patent. Next (in act 1220), the patent matching analysis system analyzes the extracted classification items to derive the source patent's taxonomy, such as hierarchical items classification composition. In some embodiments, the patent matching analysis system then analyzes the source patent to generate patent ontology, including (but are not limited to) objects, relations, hierarchical direct and cross indirect (act 1230).

Next, the patent matching analysis system then searches based on the selected patent family class into the target patent system and generates one or more sets of pairings, selects target patents (which may also be referred to as candidate patents), and determine closeness factor for a next process (act 1240). The act 1240 may repeat as many times as necessary to identify closer target patents. The target patents (i.e., candidate patents) are then analyzed to select closer target patents (act 1250). In act 1250, the patent matching analysis system generates taxonomy and ontology for the target patents or candidate patents. The act 1250 may be repeated for each of the target patents or candidate patents. Based on the generated taxonomy for each of the target patents or candidate patents, the taxonomy of the target patents and candidate patents are then compared with the taxonomy of the source patent to compute a closeness factor or a precision value (act 1260). The act 1260 is repeated for each target patent or candidate patent. The target patents or candidate patents are then refined based on the computed closeness factors and precision value.

Further, in some embodiments, the ontology of the target patents or candidate patents are also compared with the ontology of the source patent to compute a closeness factor or a precision value (act 1270). Similarly, the act 1270 may also be repeated for each target patent or candidate patent. In some embodiments, the patent matching analysis system may further refine the selection of target patent to a subset 1272 based on selected patent taxonomy and/or target patent taxonomy. Finally, the closeness factors computed based on the taxonomy and ontology are analyzed (e.g., sorted and ranked) to refine the selection of the target patents. (act 1280). For example, the target patents that have closeness factors that are within acceptance factor value are kept, and the target patents that have closeness factors that are out of bound are discarded. The refined selection of target patents is stored. The stored refined selection of target patents may then be used for searching a new set of pairings (act 1240). This process may repeat as many times as it is necessary to achieve a substantially contained set of target patents.

Figure 12B:
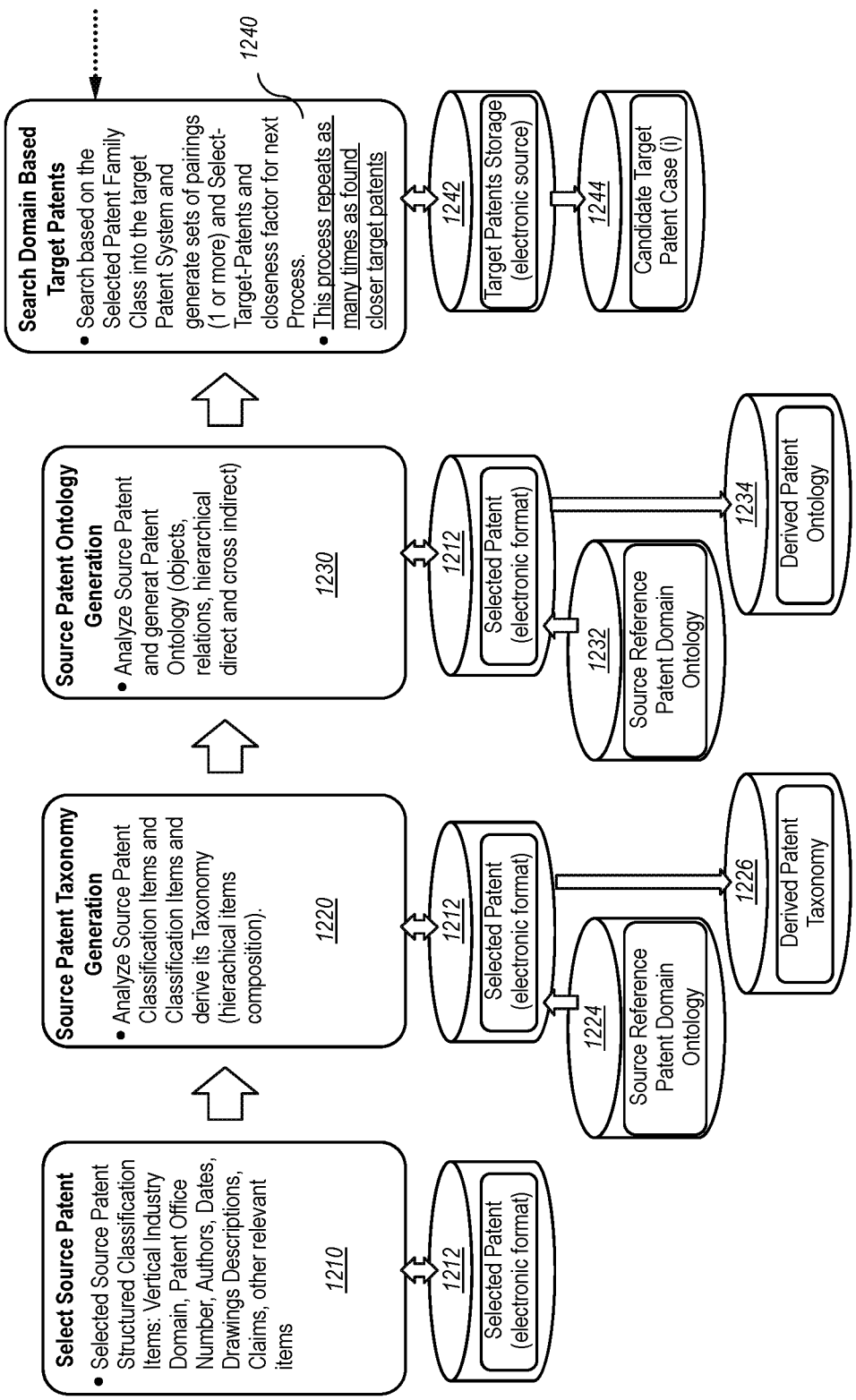
Figure 12C:
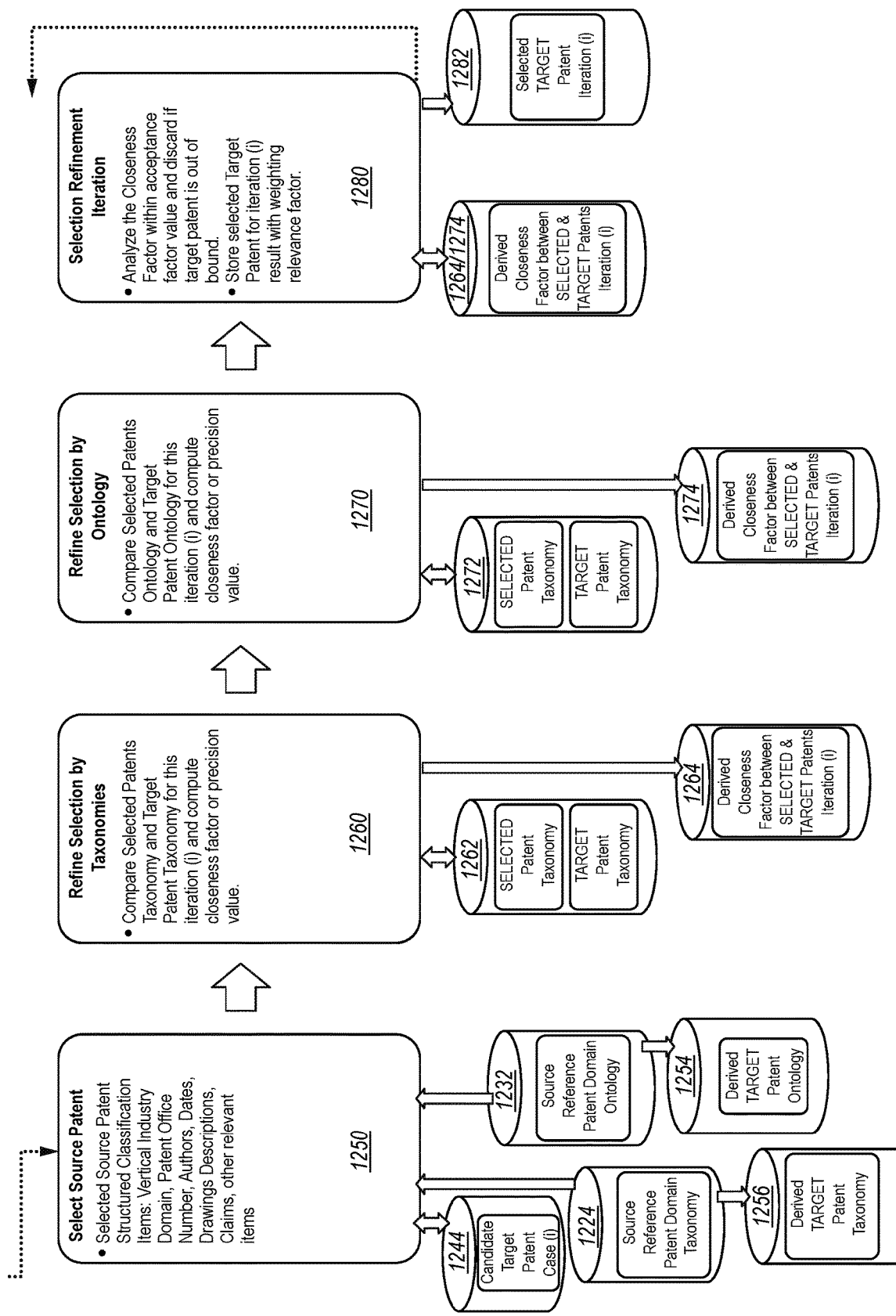

FIGS. 12B-12C illustrate additional details of the process 1200 illustrated in FIG. 12A. As illustrated in FIG. 12B, first, the patent matching analysis system selects a source patent (act 1210), which corresponds to the act 1210 of FIG. 12A. In act 1210, the patent matching analysis system accesses a patent document depository system that stores many patent documents in electronic format, including the selected source patent 1212. Next, the patent matching analysis system analyzes the source patent classification items to derive taxonomy (e.g., hierarchical items classification composition) (act 1220), which corresponds to the act 1220 of FIG. 12A. In act 1220, the patent matching analysis system generates a source reference patent domain taxonomy 1224 based on the selected patent 1212 and a derived patent taxonomy system 1226. In some embodiments, the patent matching analysis system also generates a source patent ontology (act 1230), which corresponds to the act 1230 of FIG. 12A. In the act 1230, the patent matching analysis system generates a source reference patent ontology 1232 based on a derived patent ontology 1234 and the selected source patent 1212. Finally, the patent matching analysis system performs a search based on the selected patent family class of the target patent system and generate one or more sets of parings, selects target patents, and generates closeness factors for a next process (act 1240), which corresponds to the act 1240 of FIG. 12A. In act 1240, the patent analysis system generates a set of candidate target patents 1244, from which a set of target patents 1242 may then be selected.

FIG. 12C is a continuation of FIG. 12B. Referring to FIG. 12C, the patent matching analysis system selects a set of closer patent cases from the target patents (act 1250), which corresponds to the act 1250 of FIG. 12A. In act 1250, the patent matching analysis system derives the target patent taxonomy 1256 and target patent ontology 1254. The patent matching analysis system then refines the selection of the target patents by taxonomies (act 1260), which corresponds to the act 1260 of FIG. 12A. In act 1260, the patent matching analysis system computes a taxonomy closeness factor 1264 between each selected target patent and the source patent based on the taxonomy of the selected target patents and the source patent. Based on the taxonomy closeness factors 1264, the patent matching analysis system then refines the selection of target patent to a subset 1262 of the original selection of target patent. In some embodiments, the patent matching analysis system also refines the selection of the target patent based on ontology (act 1270), which corresponds to the act 1270 of FIG. 12C. In act 1270, the patent matching analysis system computes an ontology closeness factor 1274 between each selected target patent and the source patent based on the ontology of the target patents and the source patent. Based on the ontology closeness factors 1274, the patent matching analysis system may also refine the selection of target patents. Finally, the patent matching analysis system selects target patents 1282 based on the derived taxonomy closeness factor 1264 and ontology closeness factor 1274 (act 1280), which corresponds to the act 1280 of FIG. 12A.

Figure 12D:
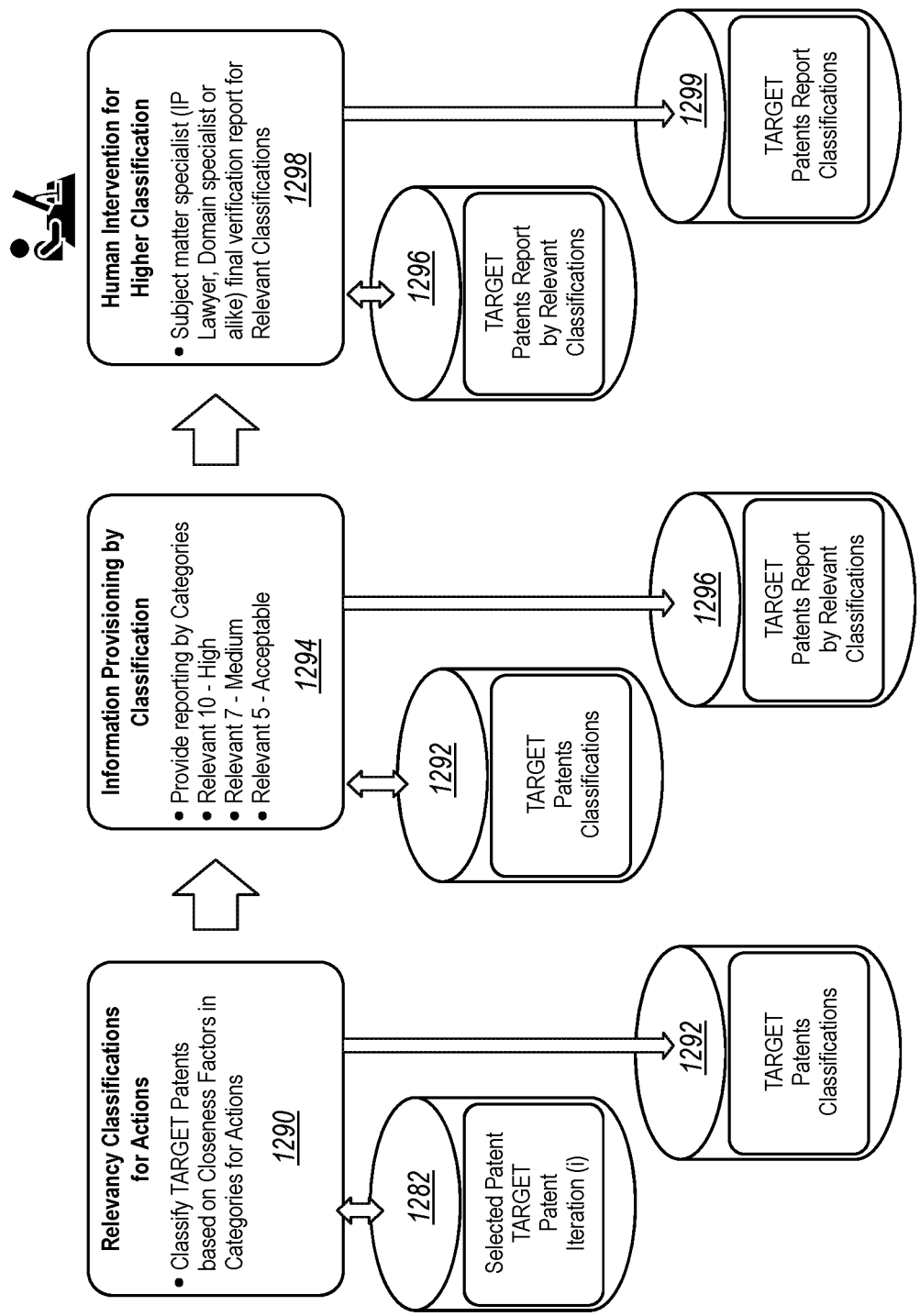

FIG. 12D illustrates an example embodiment of finalizing target patents, including human intervention. As illustrated in FIG. 12D, the selected target patents 1212 may further be classified based on the taxonomy and/or ontology closeness factors in classifications 1292 for further actions (act 1290). Based on the target patent classifications 1292, the patent matching analysis system may then provides reporting 1296 by categories (act 1294). For example, the categories may be based on relevancy scores, e.g., relevant 10—high, relevant 7—medium, and/or relevant 5—acceptable. Finally, in some embodiments, human intervention may be allowed. For example, subject matter specialists (IP lawyers, domain specialists or alike) may be tasked to review and verify the target patents report by relevant classifications 1296 (act 1298). After the human review, the verified or confirmed report 1299 is then generated.

FIG. 12D is an overall process 1200 of matching a source patent and generating relevant target patents, which corresponds to the process 1200 of FIG. 12A. As illustrated in FIG. 12D, the patent matching analysis system has accesses to patent office data sources 1202 and court case data sources 1204 and performs the acts 1210 through 1280 to generate corresponding relevant target patents 1206.

Figure 12E:
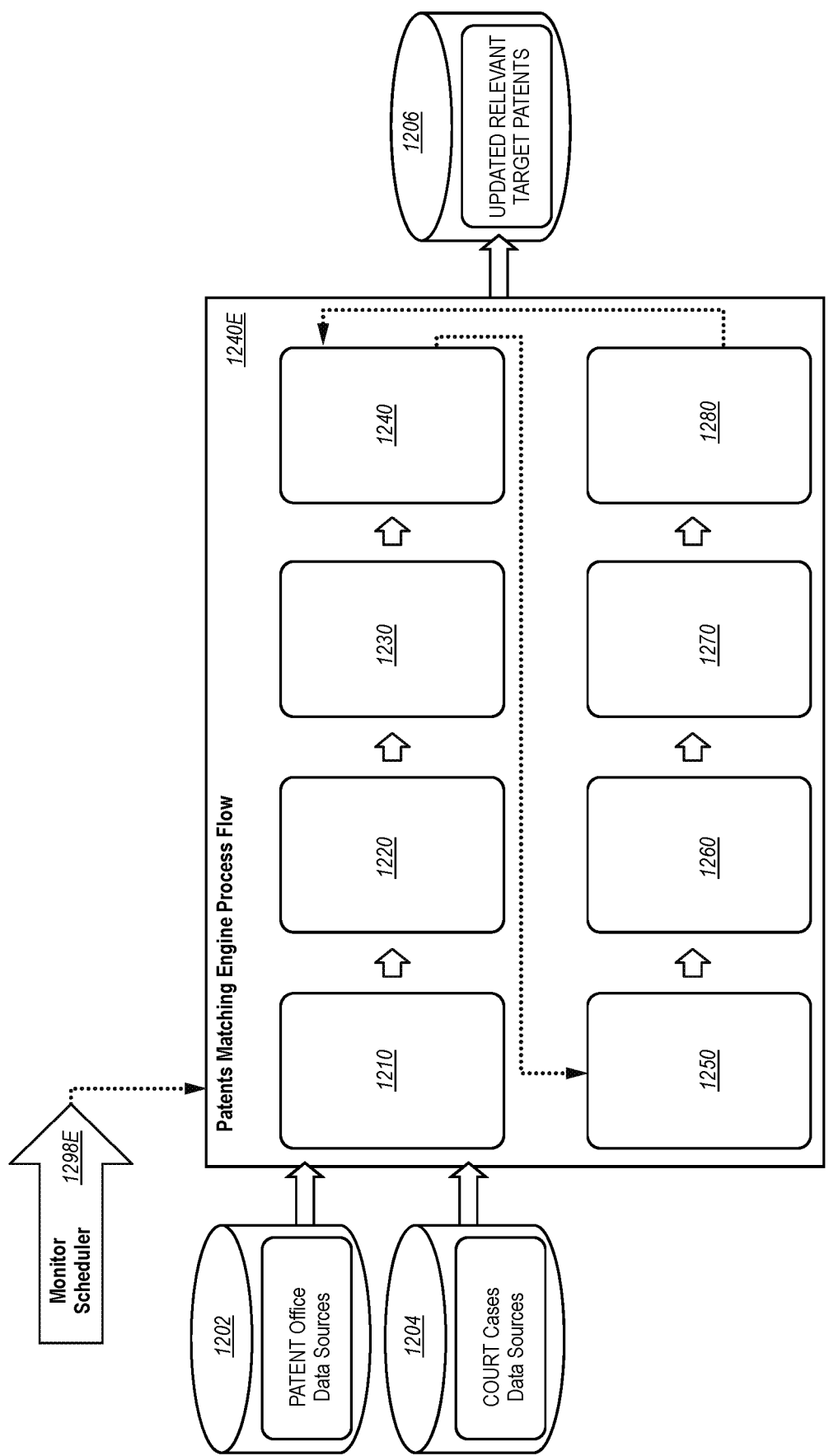

FIG. 12E illustrates an embodiment of patent matching engine process flow 1240E that is configured to receive human interventions from a monitor scheduler 1298E. The patent matching engine may be configured to trigger one or more periodical events, which, in turn, require the monitor scheduler 1298E to manually confirm or reject additional processes of finding additional patents, refining the search criterion of the process, and/or verifying whether the existing results are correct or incorrect. The monitor scheduler 1298E's inputs may then be used as feedback to the patent matching engine to cause the patent matching engine to learn from the monitor scheduler 1298E's inputs to generate better search results in the future. For example, in some embodiments, when the monitor scheduler 1298E rejects a target patent output by the patent matching engine, the patent matching engine may update the classification of the rejected target patent in the taxonomy system, such that when a new search is performed, the search results would be based on the updated taxonomy system.

Finally, because the principles described herein may be performed in the context of a computing system, some introductory discussion of a computing system will be described with respect to FIG. 13.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
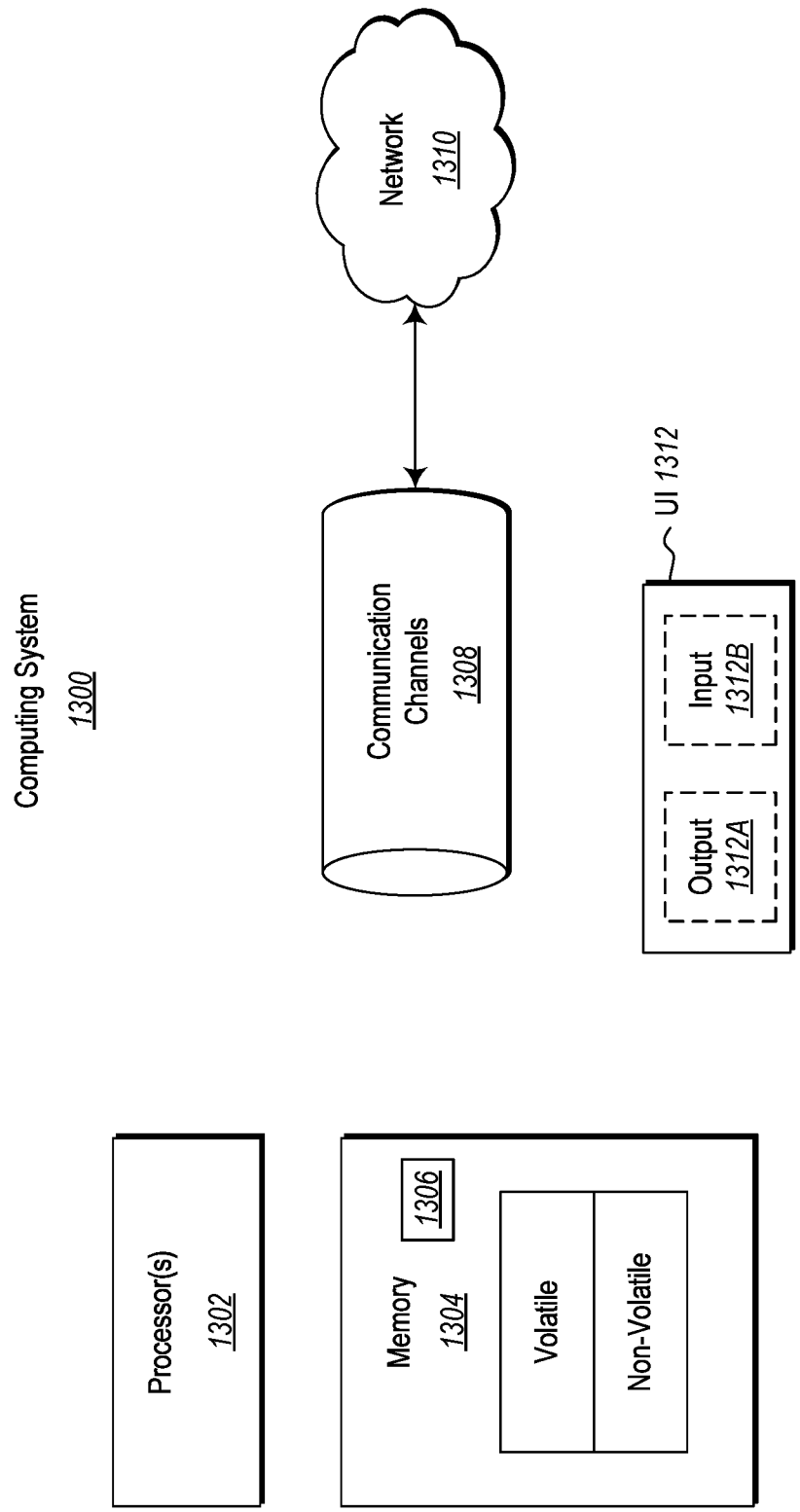
FIG. 13 illustrates an example computing system in which the principles described herein may be employed.

As illustrated in FIG. 13, in its most basic configuration, a computing system 1300 typically includes at least one hardware processing unit 1302 and memory 1304. The processing unit 1302 may include a general-purpose processor and may also include a field-programmable gate array (FPGA), an application-specific integrated circuit (ASIC), or any other specialized circuit. The memory 1304 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1300 also has thereon multiple structures often referred to as an "executable component". For instance, memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hardwired logic gates. The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface system 1312 for use in interfacing with a user. The user interface system 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, holograms and so forth. Examples of input mechanisms 1312B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1300 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processing unit 1302 and memory 1304, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having stored thereon computer-executable instructions that are structured such that, when executed by the one or more processors, cause the computing system to perform at least:
use hierarchical classification to classify a plurality of patent documents into a plurality of categories, wherein using hierarchical classification to classify the plurality of patent documents into the plurality of categories includes:
for each patent document of the plurality of patent documents, perform the following:
parse textual information of the patent document using a natural language processing (NLP) engine,
based upon the textual information of the patent document, extract a third set of features representing the textual information of the patent document,
transform the third set of features into a third feature vector, the third feature vector being a vector having a plurality of dimensions, each of which corresponds to a value of a feature contained in the third set of features,
use hierarchical classification to classify the plurality of third feature vectors corresponding to the plurality of patent documents into the plurality of categories, and
calculate a centroid of all the plurality of third feature vectors corresponding to all the plurality of patent documents within each category as a category feature vector for the corresponding category;
identify a first patent document in one or more first data systems, the first patent document not categorized in a machine-learning-generated taxonomy system;
retrieve the first patent document from the one or more first data systems;
use the NLP engine to parse textual information from the first patent document;
extract a fourth set of features of the first patent document from the textual information of the first patent document;
transform the fourth set of features into a fourth feature vector, the fourth feature vector being a vector having a plurality of dimensions, each of which corresponds to a value of a feature contained in the fourth set of features;
compare the fourth feature vector corresponding to the first patent document with each category feature vector to determine a similarity;
assign the first patent document to a category corresponding to a category feature vector that has a highest similarity to the fourth feature vector corresponding to the first patent document;
receive an input indicating a source patent, the source patent being a patent application or an issued patent published by the one or more first data systems;
retrieve a source patent document associated with the source patent from the one or more first data systems;
parse textual information of the source patent document using the NLP engine;
based upon the textual information of the source patent document, extract a first set of features that represent the textual information of the source patent document;
transform the first set of features to a first feature vector, the first feature vector being a vector having a plurality of dimensions, each of which corresponds to a value of a feature contained in the first set of features;
determine a similarity between the first feature vector corresponding to the source patent document and a particular category feature vector corresponding to a particular category, wherein the particular category feature vector comprises a particular centroid of all the plurality of third feature vectors corresponding to all the patent documents within the particular category;

identify a plurality of candidate patents within the particular category;
for each of the plurality of candidate patents, perform the following:
retrieve a candidate patent document from one of the one or more first data systems,
parse textual information of the candidate patent document using the NLP engine,
based upon the textual information of the candidate patent document, extract a second set of features representing the textual information of the candidate patent document,
transform the second set of features into a second feature vector, the second feature vector being a vector having a plurality of dimensions, each of which corresponds to a value of a feature contained in the second set of features, and
determine a similarity between the first feature vector corresponding to the source patent document and the second feature vector corresponding to the candidate patent document;
based on the similarities between the first feature vector and each second feature vector, identify one or more target patents; and
visualize the source patent and the one or more target patents.

2. The computing system of claim 1, wherein when the input indicates a court case, performing the following:
retrieving a court document associated with the court case from one or more second data systems that publish court documents;
parsing textual information of the court document using the NLP engine; and
based upon the textual information of the court document, identifying that a patent is associated with the court document and treating the patent as the source patent.

3. The computing system of claim 2, the computing system further configured to parse the input of the source patent or the court case to determine which one of the one or more first data systems or which one of the one or more second data systems contains the source patent or the court document associated with the court case.

4. The computing system of claim 1, wherein identifying the one or more target patents includes:
when a similarity between the first feature vector corresponding to the source patent and a second feature vector corresponding to a candidate patent is greater than a predetermined threshold, determining that the candidate patent is a target patent.

5. The computing system of claim 1, wherein determining whether the candidate patent is a target patent includes:
identifying a predetermined number of candidate patents that correspond to second feature vectors that have highest similarities to the first feature vector as target patents.

6. The computing system of claim 1, wherein identifying the plurality of candidate patents includes at least one of:
identifying a plurality of patents that have an application date within a predetermined period; or
identifying a plurality of patents that have an assignee that is within a list of predetermined entities.

7. The computing system of claim 1, wherein:
parsing textual information of the source patent document using a NLP engine includes identifying a list of keywords associated with the source patent; and
identifying a plurality of patents that contain the list of keywords as the plurality of candidate patents.

8. The computing system of claim 1, wherein:
parsing textual information of the source patent document using a NLP engine includes identifying at least one of (1) an international class, (2) a U.S. class, or (3) a field of search of the source patent; and
identifying the plurality of candidate patents includes identifying a plurality of patents that share at least one of (1) the international class, (2) a U.S. class, or (3) the field of search as the plurality of candidate patents.

9. The computing system of claim 1, wherein identifying a plurality of candidate patents comprises:
determining that the source patent belongs to one of a plurality of categories in a the machine-learning-generated taxonomy system; and
identifying a plurality of patents that belong to the one of the plurality of categories in the machine-learning-generated taxonomy system as the plurality of candidate patents.

10. The computing system of claim 1, wherein:
parsing textual information of the patent document further includes identifying at least one of: (1) textual information of a title of the patent document, (2) textual information of an abstract section of the patent document, or (3) textual information of a claim section of the patent document, and each of the first set of features, the second set of features, the third set of features, or the fourth set of features is extracted based on the identified (1) textual information of the title of the patent document, (2) textual information of the abstract section of the patent document, or (3) textual information of the claim section of the patent document.

11. The computing system of claim 1, wherein:
parsing textual information of the source patent document further includes identifying textual information of a cross-reference section of the source patent document, and
based on the textual information of the cross-reference section of the source patent document, the computing system is further caused to:
identify a second source patent that is contained in the cross-reference section of the source patent and published by the first data system or a second data system;
retrieve a second source patent document associated with the second source patent from one of the one or more first data systems;
parse textual information of the second source patent document using a natural language processing (NLP) engine;
based upon the textual information of the second source patent document, extract a fifth set of features representing the textual information of the second source patent;
transform the fifth set of features into a fifth feature vector, the fifth feature vector having a plurality of dimensions, each of which corresponds to a value of a feature contained in the fifth set of features;
identify a plurality of second candidate patents based on the second source patent document;
for each of the plurality of second candidate patents,
retrieve a second candidate patent document associated with the second candidate patent from the one or more first data systems;
parse textual information within the second candidate patent using the NLP engine;

based upon the textual information within the second candidate patent, generating a sixth set of features representing the textual information within the second candidate patent;

transform the sixth set of features into a sixth feature vector, the sixth feature vector being a vector having a plurality of dimensions, each of which corresponds to a value of a feature contained in the sixth set of features; and determine a similarity between the fifth feature vector and the sixth feature vector;

based on the similarity between the fifth feature vector and each sixth feature vector, identify one or more second target patents, and visualize the second source patent and the one or more second target patents.

12. The computing system of claim 1, wherein parsing textual information of the source patent document further includes identifying textual information of cited references during prosecution of the source patent document, and the computing system is further caused to:

identify one or more referenced patents contained in the cited references as one or more third target patents;

for each of the one or more third target patents, perform the following:

retrieve a third target patent document associated with a third target patent from the one or more first data systems;

parse textual information of the third target patent document using the NLP engine;

based upon the textual information of the third target patent document, generating a seventh set of features representing the textual information of the third target patent document;

transform the seventh set of features into a seventh feature vector, the seventh feature vector being a vector having a plurality of dimensions, each of which corresponds to a value of a feature contained in the seventh set of features; and determine a similarity between the first feature vector and the seventh feature vector; and visualize the source patent and the one or more third target patents.

13. The computing system of claim 1, the computing system is further caused to:

receive a user input accepting or rejecting at least one target patent;

in response to a user input, remove the at least one target patent from the visualization; and update classification of the at least one target patent in the machine-learning-generated taxonomy system.

* * * * *